United States Patent [19]

Weber et al.

[11] Patent Number: 5,308,538

[45] Date of Patent: May 3, 1994

[54] SUPERTWIST LIQUID-CRYSTAL DISPLAY

[75] Inventors: Georg Weber, Erzhausen; Joachim Rüger; Klaus-Peter Stahl, both of Darmstadt; Martina Schmidt, Münster; Detlef Pauluth, Ober-Ramstadt; Michael Römer, Rodgau, all of Fed. Rep. of Germany

[73] Assignee: Merck Patent Gesellschaft Mit Beschrankter Haftung, Darmstadt, Fed. Rep. of Germany

[21] Appl. No.: 802,903

[22] Filed: Dec. 6, 1991

[30] Foreign Application Priority Data

Dec. 7, 1990 [DE] Fed. Rep. of Germany ....... 4039052
Apr. 12, 1991 [DE] Fed. Rep. of Germany ....... 4111964
Jun. 12, 1991 [DE] Fed. Rep. of Germany ....... 4119292

[51] Int. Cl.$^5$ .................... C09K 19/34; C09K 19/52; C09K 19/30; C09K 19/12
[52] U.S. Cl. .................. 252/299.61; 252/299.01; 252/299.63; 252/299.66; 359/106
[58] Field of Search ............ 252/299.01, 299.61, 252/299.62, 299.63, 299.64, 299.65, 299.66, 299.67, 299.7; 359/103, 106

[56] References Cited

U.S. PATENT DOCUMENTS

| | | | |
|---|---|---|---|
| 5,122,295 | 6/1992 | Weber et al. | 252/299.01 |
| 5,164,114 | 11/1992 | Kurmeier et al. | 252/299.61 |
| 5,171,469 | 12/1992 | Hittich et al. | 252/299.01 |
| 5,178,790 | 1/1993 | Weber et al. | 252/299.01 |

*Primary Examiner*—Shean C. Wu
*Attorney, Agent, or Firm*—Millen, White, Zelano & Branigan

[57] ABSTRACT

Supertwist liquid-crystal displays having excellent properties are obtained using a nematic liquid-crystal mixture based on component A which contains one or more compounds of the formula IIa or IIb:

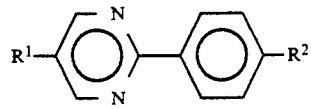

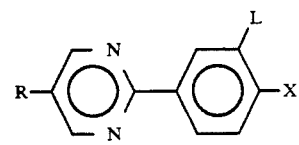

on or more compounds of the formulae IIc to IIe:

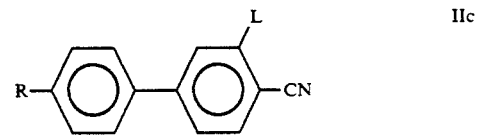

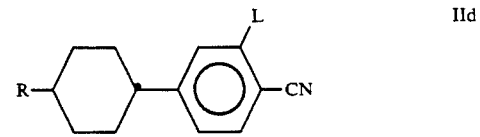

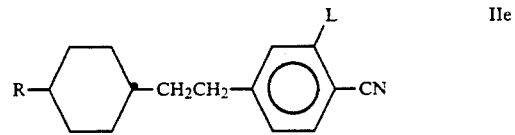

and one or more compounds of the formula IIf to IIh:
and one or more compounds of the formula IIf to IIh:

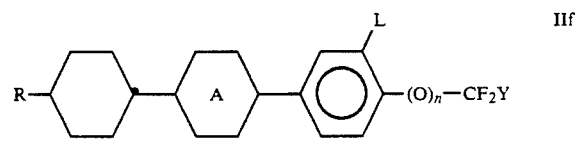

(Abstract continued on next page.)

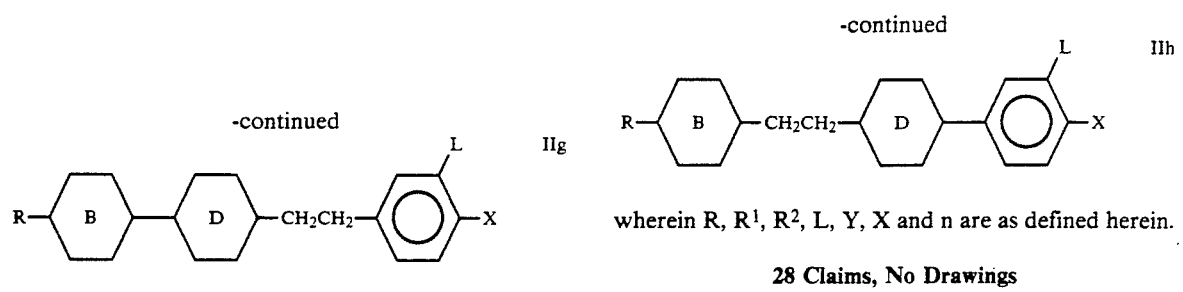
wherein R, R$^1$, R$^2$, L, Y, X and n are as defined herein.
28 Claims, No Drawings

SUPERTWIST LIQUID-CRYSTAL DISPLAY

SUMMARY OF THE INVENTION

The invention relates to supertwist liquid-crystal displays (SLCD) having very short switching times and good steepnesses and angle dependencies, and to the novel nematic liquid-crystal mixtures used therein.

SLCDs as defined in the preamble are known, for example from EP 0 131 216 B1; DE 34 23 993 A1; EP 0 098 070 A2; M. Schadt and F. Leenhouts, 17th Freiburg Congress on Liquid Crystals (8–10.04.87); K. Kawasaki et al., SID 87 Digest 391 (20.6); M. Schadt and F. Leenhouts, SID 87 Digest 372 (20.1); K. Katoh et al., Japanese Journal of Applied Physics, Vol. 26, No. 11, L 1784-L 1786 (1987); F. Leenhouts et al., Appl. Phys. Lett. 50 (21), 1468 (1987); H. A. van Sprang and H. G. Koopman, J. Appl. Phys. 62 (5), 1734 (1987); T. J. Scheffer and J. Nehring, Appl. Phys. Lett. 45 (10), 1021 (1984), M. Schadt and F. Leenhouts, Appl. Phys. Lett. 50 (5), 236 (1987) and E. P. Raynes, Mol. Cryst. Liq. Cryst. Letters Vol. 4 (1), pp. 1–8 (1986). The term SLCD here covers any more highly twisted display element with a value for the twist angle of between 160° and 360°, such as, for example, the display elements of Waters et al. (C. M. Waters et al., Proc. Soc. Inf. Disp. (New York) (1985) (3rd Intern. Display Conference, Kobe, Japan), STN-LCDs (DE-A 35 03 259), SBE-LCDs (T. J. Scheffer and J. Nehring, Appl. Phys. Lett. 45 (1984) 1021), OMI-LCDs (M. Schadt and F. Leenhouts, Appl. Phys. Lett. 50 (1987), 236), DST-LCDs (EP-A 0 246 842) or BW-STN-LCDs (K. Kawasaki et al., SID 87 Digest 391 (20.6)).

SLCDs of this type are distinguished, in comparison to standard TN (twisted nematic) displays, by significantly better steepnesses of the electrooptical characteristic line and consequently better contrast values, and by significantly less angle dependence of the contrast. Of particular interest are SLCDs having very short switching times, in particular also at relatively low temperatures. In order to achieve short switching times, the viscosities, in particular, of the liquid-crystal mixtures were hitherto optimized using usually monotropic additives having relatively high vapor pressure. However, the switching times achieved were not adequate for all applications.

Similar liquid-crystal mixtures are described (for example JP 60/51,778 and EP 0 232 052), but these mixtures are less suitable for SLCDs due to the low steepness of their electrooptical characteristic line.

In order to achieve a steep electrooptical characteristic line, the liquid-crystal mixtures should have relatively large values for $K_3/K_1$ and relatively small values for $\Delta\epsilon/\epsilon_\perp$.

In addition to optimization of the contrast and the switching times, further important requirements are made of mixtures of this type:
1. A broad d/p window
2. High long-term chemical stability
3. High electrical resistance
4. Low frequency dependence of the threshold voltage.

The parameter combinations achieved are still by far inadequate, in particular for high-multiplex supertwisted nematics, i.e., STNs (1/400). This is in some cases attributable to the fact that the various requirements are affected in opposite manners by material parameters.

There thus continues to be a great demand for SLCDs having very short switching times and at the same time a large operating temperature range, high characteristic line steepness, good angle dependence of the contrast and low threshold voltage which meet the above-mentioned requirements.

An object of the invention is to provide SLCDs which do not have the abovementioned disadvantages, or only do so to a lesser extent, and at the same time have very short switching times.

Upon further study of the specification and appended claims, further objects and advantages of this invention will become apparent to those skilled in the art.

It has now been found that the objects can be achieved if the nematic liquid-crystal mixture
a) is based on component A, which contains one or more compounds of the formula IIa or IIb:

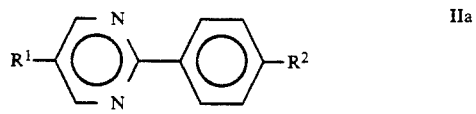

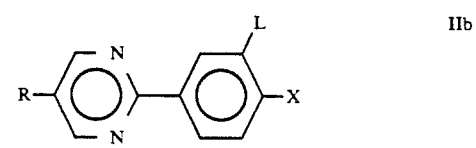

one or more compounds of the formulae IIc or IIe:

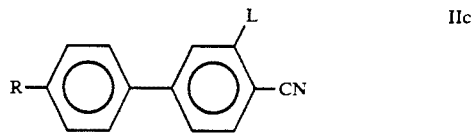

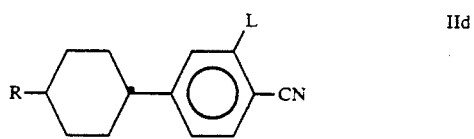

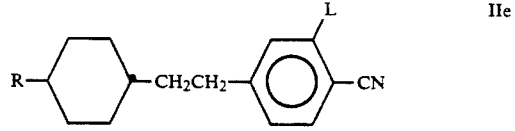

and one or more compounds of the formulae IIf to IIh:

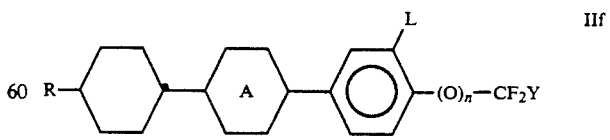

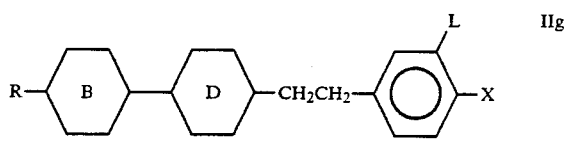

-continued

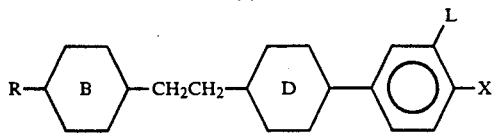

in which
R is n-alkyl, n-alkoxy or n-alkenyl having up to 9 carbon atoms,
$R^1$ and $R^2$ are each as defined for R,

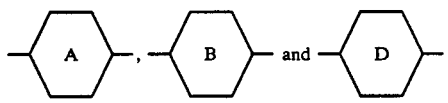

are each, independently of one another,

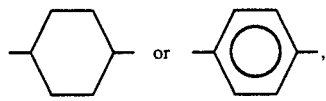

L and Y are each H or F,
X is F, Cl, —$CF_3$, —$CHF_2$, —$OCF_3$, —$OCHF_2$, —$OCF_2CF_2H$ or —$OC_2F_5$, and
n is 0 or 1,
b) contains 0–40% by weight of a liquid-crystalline component B, comprising one or more compounds having a dielectric anisotropy of from −1.5 to +1.5, of the general formula I

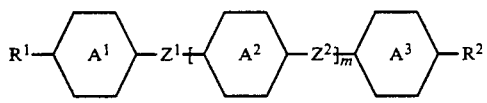

in which
$R^1$ and $R^2$ are each, independently of one another, n-alkyl, n-alkoxy, n-oxaalkyl, straight-chain ω-fluoroalkyl or n-alkenyl having up to 9 carbon atoms,
$A^1$, $A^2$ and $A^3$ are each, independently of one another, 1,4-phenylene, 2- or 3-fluoro-1,4-phenylene, trans-1,4-cyclohexylene or 1,4-cyclohexenylene,
$Z^1$ and $Z^2$ are each, independently of one another, —$CH_2CH_2$—, —C≡C— or a single bond, and
m is 0, 1 or 2,
c) contains 0–20% by weight of a liquid-crystalline component C, comprising one or more compounds having a dielectric anisotropy of below −1.5, and
d) contains an optically active component D in such an amount that the ratio between the layer thickness (separation of the plane-parallel outer plates) and the natural pitch of the chiral nematic liquid-crystal mixture is from about 0.2 to 1.7, in particular from about 0.2 to 1.3, and the nematic liquid-crystal mixture has a nematic phase range of at least 60° C., a viscosity of not more than 35 mPa.s and a dielectric anisotropy of at least +1, the dielectric anisotropies of the compounds and the parameters based on the nematic liquid-crystal mixture being based on a temperature of 20° C.

The invention thus relates to an SLCD containing two plane-parallel outer plates which, together with a frame, form a cell, a nematic liquid-crystal mixture of positive dielectric anisotropy which is present in the cell,
electrode layers with superposed alignment layers on the insides of the outer plates,
a pitch angle between the longitudinal axis of the molecules at the surface of the outer plates and the outer plates of form about 1 degree to 30 degrees, and
a twist angle of the liquid-crystal mixture in the cell from alignment layer to alignment layer with a value of between 100° and 600°, characterized in that the nematic liquid crystal mixture
a) is based on component A, which contains
one or more compounds of the formula IIa or IIb:

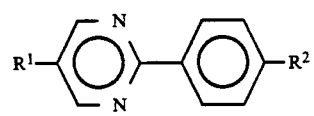

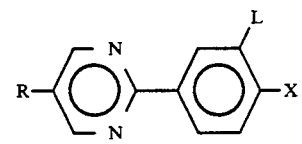

one or more compounds of the formulae IIc or IIe:

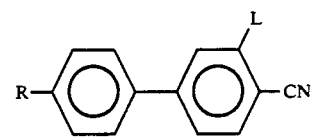

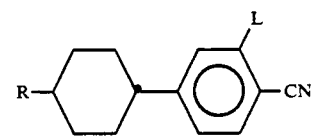

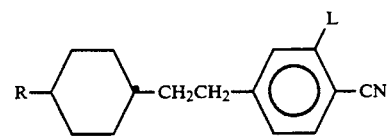

and one or more compounds of the formulae IIf to IIh:

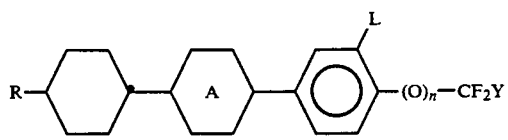

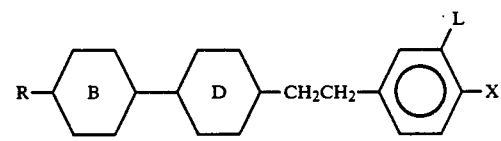

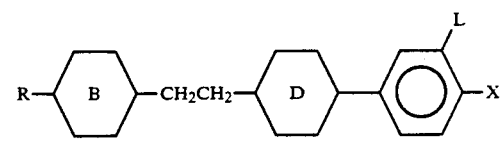

in which

R is n-alkyl, n-alkoxy or n-alkenyl having up to 9 carbon atoms, $R^1$ and $R^2$ are each as defined for R,

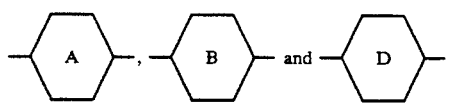

are each, independently of one another

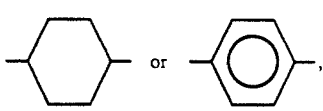

L and Y are each H or F,

X is F, Cl, —$CF_3$, —$CHF_2$, —$OCF_3$, —$OCHF_2$, —$OCF_2CF_2H$ or —$OC_2F_5$, and n is 0 or 1, b) contains 0–40% by weight of a liquid-crystalline component B, comprising one or more compounds having a dielectric anisotropy of from −1.5 to +1.5, of the general formula I

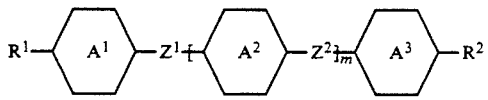

I in which $R^1$ and $R^2$ are each, independently of one another, n-alkyl, n-alkoxy, n-oxaalkyl, straight-chain ω-fluoroalkyl or n-alkenyl having up to 9 carbon atoms, $A^1$, $A^2$ and $A^3$ are each independently of one another, 1,4-phenylene, 2- or 3-fluoro-1,4-phenylene, trans-1,4-cyclohexylene or 1,4-cyclohexenylene, $Z^1$ and $Z^2$ are each, independently of one another, —$CH_2CH_2$—, —C≡C— or a single bond, and m is 0, 1 or 2, c) contains 0–20% by weight of a liquid-crystalline component C, comprising one or more compounds having a dielectric anisotropy of below −1.5, and d) contains an optically active component D in such an amount that the ratio between the layer thickness (separation of the plane-parallel outer plates) and the natural pitch of the chiral nematic liquid-crystal mixture is from about 0.2 to 1.7, and in particular from about 0.2 to 1.3 in that the nematic liquid-crystal mixture has a nematic phase range of at least 60° C., a viscosity of not more than 35 mPa.s and a dielectric anisotropy of at least +1, the dielectric anisotropies of the compounds and the parameters based on the nematic liquid-crystal mixture being based on a temperature of 20° C.

The invention also relates to corresponding liquid-crystal mixtures for use in SLCDs.

A nematic liquid-crystal mixture according to the invention preferably contains 20–99.95 wt. %, particularly 40–99.95 wt. % of component A; 0–40 wt. %, particularly 0–25 wt. %, also particularly 3–35 wt. %, especially 4–20 wt. % of component B; 0–20 wt. %, particularly 0–10 wt. %, especially 0–5 wt. % of component C; and 0.1–35 wt. %, particularly 0.1–10 wt. % of component D.

The individual compounds, for example of the formulae I and IIa to IIh, or other compounds which can be used in the SLCDs according to the invention, are either known or can be prepared analogously to the known compounds. See, for example, U.S. patent application Ser. No. 07/362,438 and 07/328,193.

Preferred liquid-crystal mixtures contain a) at least one component selected from group B4, comprising compounds of the formulae AI to AVI:

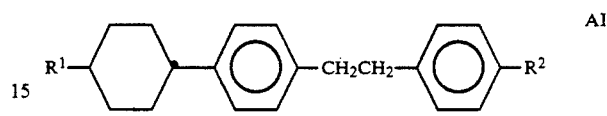

AI

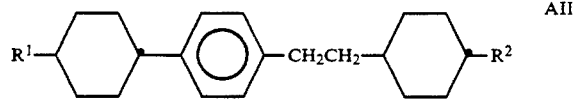

AII

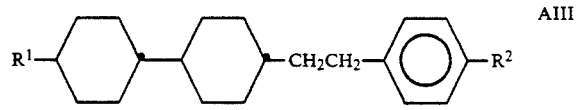

AIII

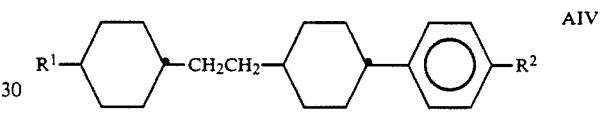

AIV

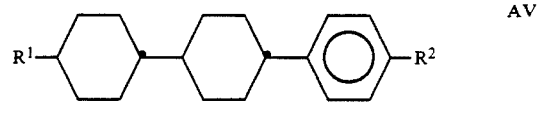

AV

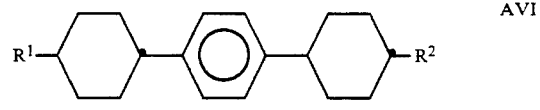

AVI in which $R^1$ and $R^2$, in each case independently of one another, are each R, and R is alkyl having 1–12 carbon atoms in which, in addition, one or two non-adjacent $CH_2$ groups may be replaced by —O—, —CH=CH—, —CO—, —O—CO— or —CO—O—, b) and/or at least one component selected from group B1 comprising the compounds of the formulae BI to BIV:

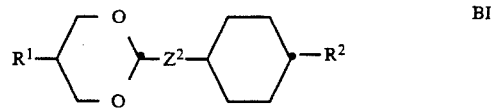

BI

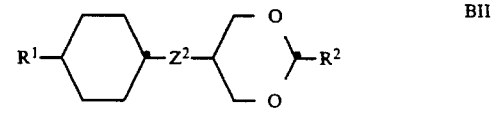

BII

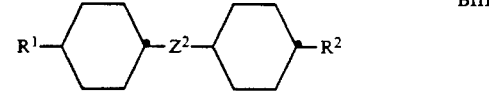

BIII

-continued

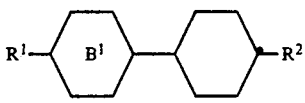
BIV in which R¹ and R², in each case independently of one another, are alkyl having 1-12 carbon atoms in which, in addition, one or two non-adjacent CH₂ groups may be replaced by —O—, —CH=CH—, —CO—, —O—CO— or —CO—O—, Z² is —CH₂CH₂—, —CO—O—, —O—CO— or a single bond, and

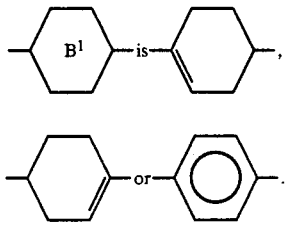

c) and/or at lest one component selected from group B2, comprising the compounds of the formulae BV to BVII:

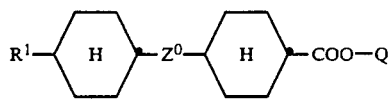
BV

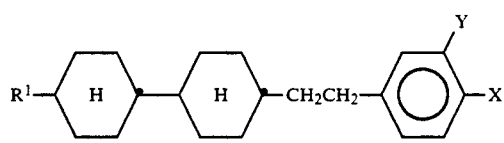
BVI

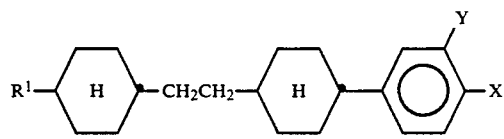
BVII in which R¹ is an alkyl having 1-12 carbon atoms in which, in addition, one or two non-adjacent CH₂ groups may be replaced by —O—, —CH=CH—, —CO—, —O—CO— or —CO—O—,
Z¹ is —CH₂CH₂— or a single bond, and

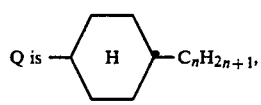
Q is

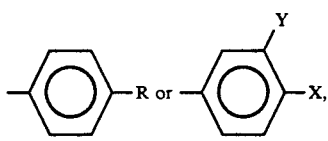

where n is 1 to 9, X is CN or F, and Y is H or F,
R is an alkyl having 1-12 carbon atoms in which, in addition, one or two non-adjacent CH₂ groups may be replaced by —O—, —CH=CH—, —CO—, —O—CO— or —CO—O—, d) and/or at least one component selected from group B3, comprising the compounds of the formula BVIII:

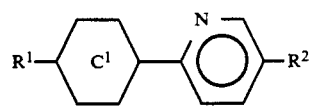
BVIII in which R¹ and R², in each case independently of one another, are alkyl having 1-12 carbon atoms in which, in addition, one or two non-adjacent CH₂ groups may be replaced by —O—, —CH=CH—, —CO—, —O—CO— or —CO—O—, and

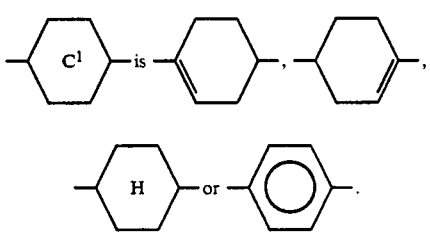

The compounds of groups B1, B2, B3, and B4 can be, in addition to components A, B, C, and D, part of components A, B, C, and D, or both.

The proportion of compounds of group B1 is preferably 0-45 wt. %, particularly 0-20 wt. %. Also, the proportion of group B4 is preferably 0-40 wt. %, particularly 0-20 wt. %. These weight percents are based on the total of the liquid crystal mixture.

Particularly preferred compounds of the formula BIII are those of the subformulae below:

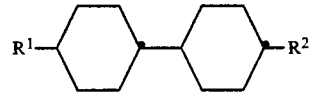

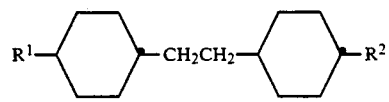

in which
R¹ is $CH_3-(CH_2)_n-O-$, $CH_3-(CH_2)_r-$, trans-H-$(CH_2)_r-CH=CH-$ $(CH_2CH_2)_s-CH_2O-$ or trans-H-$(CH_2)_r-CH=CH-(CH_2CH_2)_s-$,
R² is $CH_3-(CH_2)_t-$,
n is 1, 2, 3 or 4,
r is 0, 1, 2 or 3,
s is 0 or 1, and
t is 1, 2, 3 or 4.

Furthermore, preferred compounds of formula BIII are those of the subformula

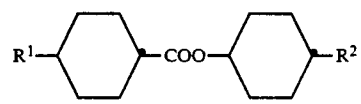

in which
R¹ is $CH_3-(CH_2)_n-O-$, $CH_3-(CH_2)_r-$, trans-H-$(CH_2)_r-CH=CH-$ $(CH_2CH_2)_s-CH_2O-$ or trans-H-$(CH_2)_r-CH=CH-(CH_2CH_2)_s-$, $R^2$ is $CH_3$—$(CH_2)_t$—,
n is 1, 2, 3 or 4,
r is 0, 1, 2 or 3,
s is 0 or 1, and
t is 1, 2, 3 or 4.

The proportion of the compounds of the formula BIII of the above-mentioned subformulae is preferably from about 5% to 45%, particularly preferably from about 10% to 35%, based on the total weight of the liquid-crystal mixture. Particularly preferred compounds of the formula BIV are those of the subformula below:

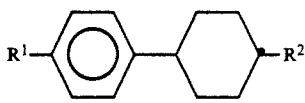

in which
$R^1$ is $CH_3$—$(CH_2)_n$—O— or trans-H—$(CH_2)_n$—CH=CH—$(CH_2CH_2)_s$—$CH_2O$— and
$R^2$ is $CH_3$—$(CH_2)_t$—, where
n is 1, 2, 3 or 4,
r is 0, 1, 2 or 3,
s is 0 or 1, and
t is 1, 2, 3 or 4.

The proportion of these compounds or of the above subformula of the compounds of the formula BIV is preferably from about 5–40%, particularly preferably from about 10–35%, based on the total weight of the liquid-crystal mixture.

The mixtures preferably contain compounds of the formula BIII, in particular those of the subformula

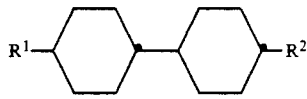

in which
$R^1$ is $CH_3$—$(CH_2)_n$—O—, $CH_3$—$(CH_2)_t$—, trans-H-$(CH_2)_r$—CH=CH— $(CH_2CH_2)_s$—$CH_2O$— or trans-H—$(CH_2)_r$—CH=CH—$(CH_2CH_2)_s$—,
$R^2$ is $CH_3$—$(CH_2)_t$—,
n is 1, 2, 3 or 4,
r is 0, 1, 2 or 3,
s is 0 or 1, and
t is 1, 2, 3 or 4.

In a particularly preferred embodiment, the mixtures simultaneously contain compounds of the formulae BIII and BIV, the total proportion for components of group B1 being observed.

If compounds of the formulae BI and/or BIII are present, $R^1$ and $R^2$ are preferably each, independently of one another, n-alkyl having 1 to 7 carbon atoms or (trans)-n-alkenyl having 3 to 7 carbon atoms. $Z^2$ is preferably a single bond. Compounds of BI are particularly preferred.

Furthermore, preferred are mixtures according to the invention which contain one or more compounds of the formula BIV in which

and $R^1$ and $R^2$ have one of the abovementioned preferred meanings described for formulae BI and/or BIII.

In any case, the total proportion for components of group B1 is observed.

the proportion of compounds of group B2 is preferably from about 5% to 45%, particularly preferably from 5% to 20%. The proportion (preferred ranges) for BV to BVII, based on the total weight of the liquid-crystal mixture, si as follows:

BV from about 5% to 30%, preferably from about 5% to 15%

Sum of BVI and BVII: from about 5% to 25%, preferably from about 10% to 20%.

Preferred compounds of group B2 are indicated below:

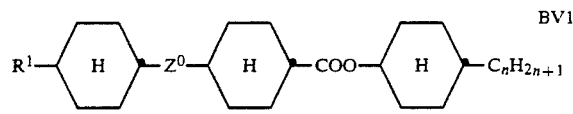

BV1

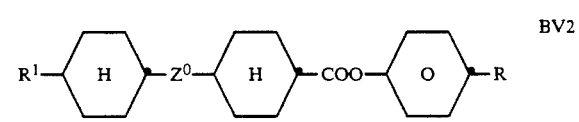

BV2

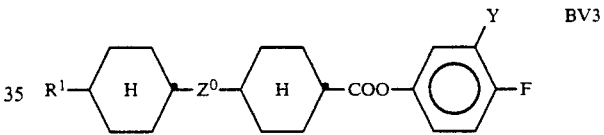

BV3

$R^1$ is preferably n-alkyl having 1 to 7 carbon atoms or (trans)-n-alkenyl having 3 to 7 carbon atoms. $Z^1$ is preferably a single bond. R preferably has the preferred meaning given above for $R^1$ or is fluorine. Y is preferably fluorine.

The mixtures according to the invention preferably contain one or more compounds selected from the group comprising BV3, BV2 and BV1 in a total proportion of from about 5 to 35%.

In a particularly preferred embodiment, the mixtures according to the invention contain, in addition to one of more compounds of BV3 and/or BV2, further terminally fluorinated compounds, for example selected from the group comprising:

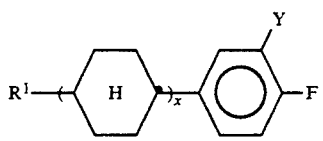

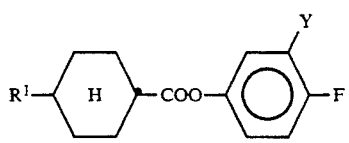

and/or polar heterocyclic compounds selected from the group comprising

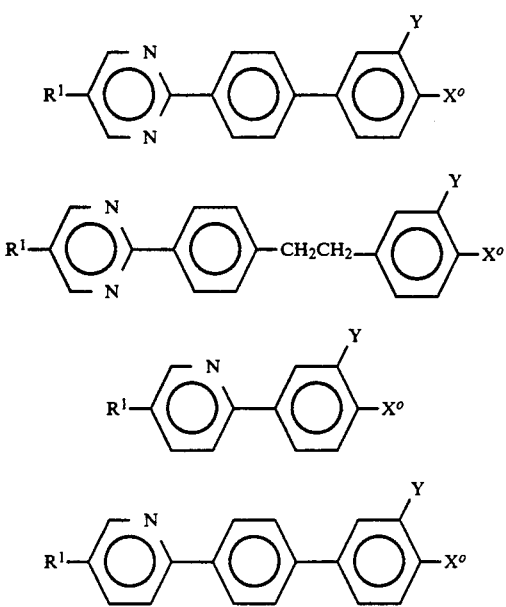

in which $R^1$ is preferably n-alkyl having 1 to 7 carbon atoms or (trans)-n-alkenyl having 3 to 7 carbon atoms, x is 1 or 2, $X^0$ is F, Cl, $CF_3$, $-OCF_3$ or $-OCHF_2$ and Y is H or F.

The total proportion of all terminally fluorinated compounds is preferably from about 5% to 65%, in particular from about 15% to 40%

The proportion of compounds from group B3 is preferably from about 5% to 30%, particularly preferably form about 10% to 20%. $R^1$ is preferably n-alkyl or n-alkoxy having 1 to 9 carbon atoms. However, it is also possible to employ analogous compounds containing alkenyl groups. Compounds of the formula BVIII are preferred.

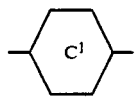

is preferably 1,4-phenylene.

The mixtures according to the invention preferably contain compounds from at lest one of groups B1, B2 and B3. They further preferably contain one or more compounds from group B1 and one or more compounds from group B2 and/or B3.

Furthermore, preferred are isothiocyanates, for example of formula

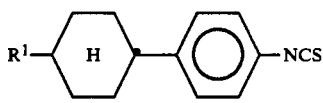

in which $R^1$ is n-alkyl having 1 to 7 carbon atoms or n-alkenyl having 3 to 7 carbon atoms.

In a particularly preferred embodiment, the mixtures according to the invention preferably contain from abut 5% to 20% of one or more compounds having a dielectric anisotropy of below −1.5 (component C). compounds of this type are known, for example derivatives of 2,3-dicyanohydroquinone or cyclohexane derivatives containing the structural element.

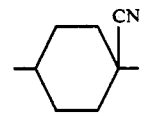

as in DE-A 32 31 707 and DEA 34 07 013.

However, for compound C, preference is given to compounds containing the structural element 2,3-difluoro-1,4-phenylene, for example, compounds as in DE-A 38 07 801, 38 07 861, 38 07 863, 38 07 864 or 38 07 908. Particular preference is given to tolans containing this structural element, as in the international Patent Application PCT/DE 88/00133, in particular those of the formulae

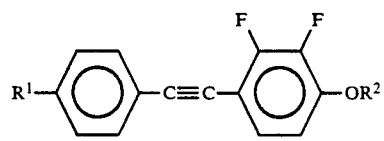

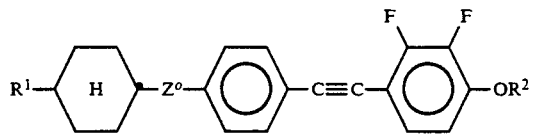

in which $R^1$ and $R^2$ are each, independently of one another, preferably n-alkyl having 1 to 7 carbon atoms or n-alkenyl having 3 to 7 carbon atoms, and $Z^0$ is $-CH_2CH_2-$ or a single bond, and the phenylpyrimidines of the formula

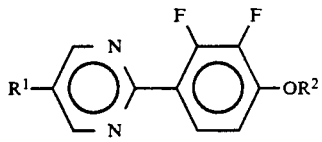

in accordance with DE-A 38 07 871.

In a particularly preferred embodiment, the mixtures contain from abut 5% to 35%, particularly preferably from about 10% to 20%, of liquid-crystalline tolan compounds. This allows smaller layer thicknesses (about 5–6 μm) to be used, giving significantly shorter switching times. Particularly preferred tolans of the formulae T1 and T2 are indicated below:

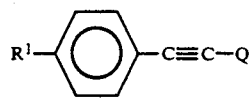

T1

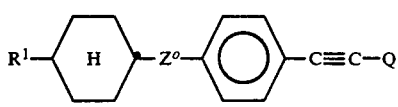

T2

$R^1$ is preferably n-alkyl or n-alkoxy having 1 to 7 carbon atoms, $Z^0$ is $-CH_2CH_2-$ or a single bond, Q is

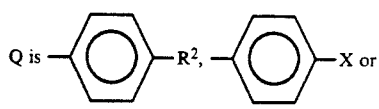

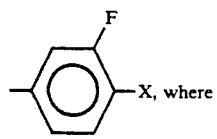

where

X is F, Cl or OCF$_3$, and

R$^2$ is n-alkyl or n-alkoxy, having 1 to 7 carbon atoms each, or n-alkenyl or n-alkenyloxy having 3 to 7 carbon atoms each.

The tolanes can be additional components or can form a part of component B.

The following are further particularly preferred embodiments:

Component A contains one or more, preferably 2, 3 or 4, compounds of the formula IIa, in particular in which R$^1$ and R$^2$ are n-alkyl having 1 to 8, preferably 1 to 5, carbon atoms, in particular in which the total number of carbon atoms in the two radicals R$^1$ and R$^2$ is from 4 to 8, in particular from 4 to 7, and/or one or more, preferably 1, 2 or 3, compounds of the formula IIb, in particular in which L is H and X is F, in particular in which R is alkyl having 1 to 5 carbon atoms.

In addition, component A contains one or more, preferably 2, 3 or 4, compounds of the formula IId, in particular in which L is H and R is n-alkyl having 1 to 8, preferably 1 to 5, carbon atoms.

Furthermore, component A contains one or more, preferably 2, 3 or 4, compounds of the formula IIf, in particular in which L is H, n is 1, Y is F and R is n-alkyl having 1 to 8, preferably 1 to 5, carbon atoms.

Furthermore, component A preferably contains, in addition to one or more compounds of the formula IIf, one or more, preferably 1, 2 or 3, compounds of the formula IIg, in particular in which L is H and X is F or OCF$_3$, or in which L and X are F.

The proportion of the compounds of the formulae IIa and IIb, based on component A, is from 10 to 40% by weight, preferably from 15 to 30 % by weight, in particular from 20 to 25% by weight.

The proportion of the compounds of the formula IId, based on component A, si form 20 to 60% by weight, preferably from 25 to 45% by weight, in particular from 30 to 35by weight.

The proportion of the compounds of the formulae IIf and IIg is from 25 to 70% by weight, preferably from 35 to 60% by weight, in particular form 40 to 50% by weight.

Particular preference is given to liquid-crystal mixtures which, in addition to the preferred compounds of component A, contain one or more compounds selected form the compounds of the formulae below,

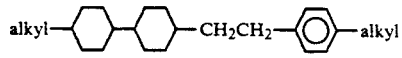

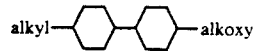

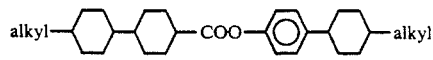

where alkyl and alkoxy are each n-alkyl or n-alkoxy having 1-8 C atoms. Compounds of the first two formulae can form a part of component B. Compounds of the third formula are preferably additional components.

Component A contains one or more compounds of the formulae IIa1-IIa2, IIb1-IIb2, IId1-IId2, IIf-1-IIf5 and/or IIg1-IIg5

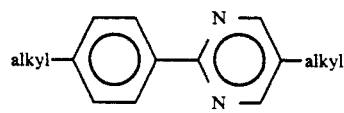
IIa1

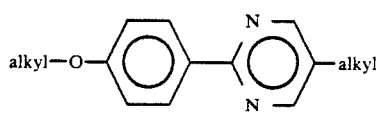
IIa2

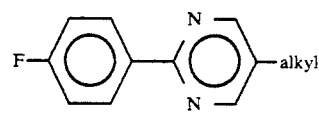
IIb1

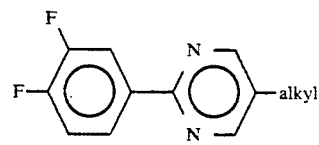
IIb2

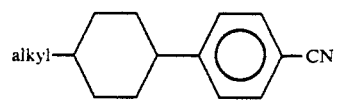
IId1

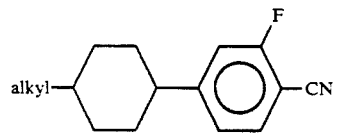
IId2

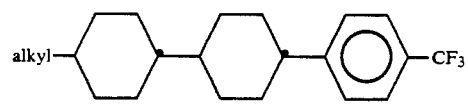
IIf1

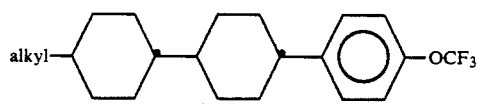
IIf2

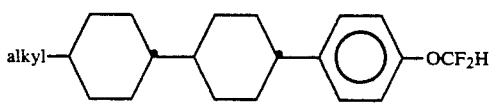
IIf3

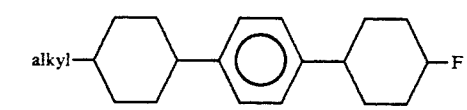
IIf4

-continued

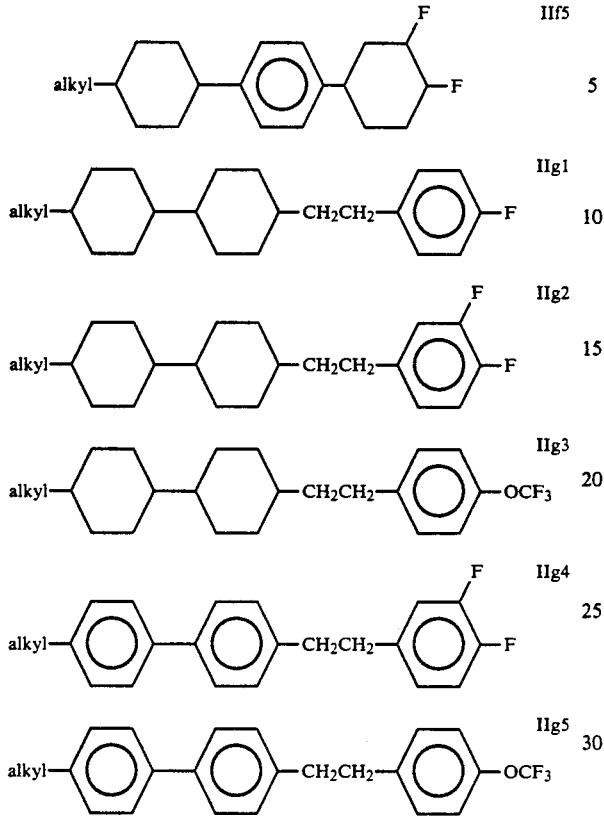

in which alkyl is n-alkyl having 1 to 9 carbon atoms,
component A contains, in addition to the compounds of the formulae IIa to IIh, one or more compounds of the formula

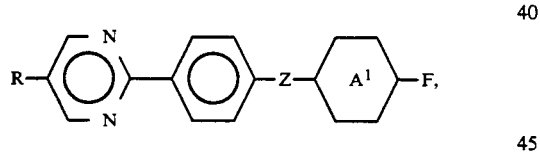

which
R is n-alkyl, n-alkoxy or n-alkenyl having 1–9 carbon atoms,
Z is —CH$_2$CH$_2$— or a single bond, and

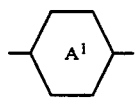

is 1,4-phenylene, 2- or 3-fluoro-1,4-phenylene or 1,4-cyclohexylene,
X of formulae IIb, IIg and IIh is F, Cl, CF$_3$, —OCHF$_2$ or CHF$_2$,
component B contains one or more compounds selected from the group comprising II1 to II7:

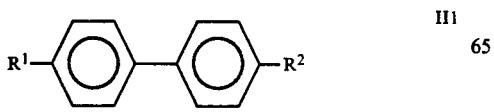

-continued

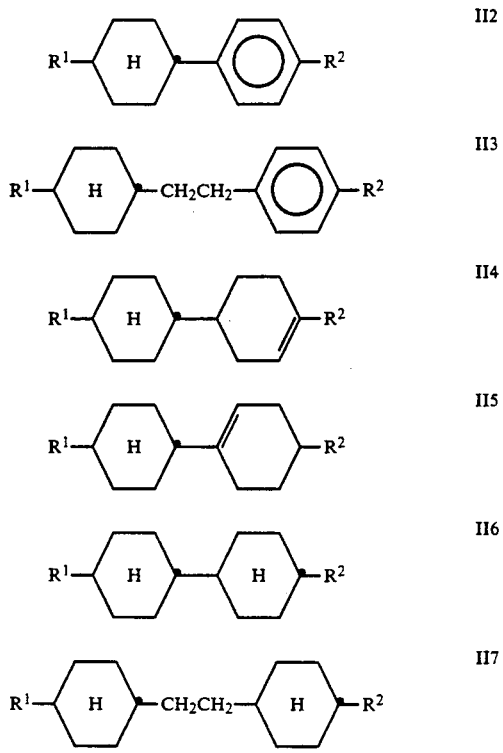

in which R$^1$ and R$^2$ are each independently n-alkyl, n-alkoxy, n-oxaalkyl, straight-chain ω-fluoroalkyl, or n-alkenyl having up to 9 carbon atoms,
component B additionally contains one or more compounds selected from the group comprising II8 to II21:

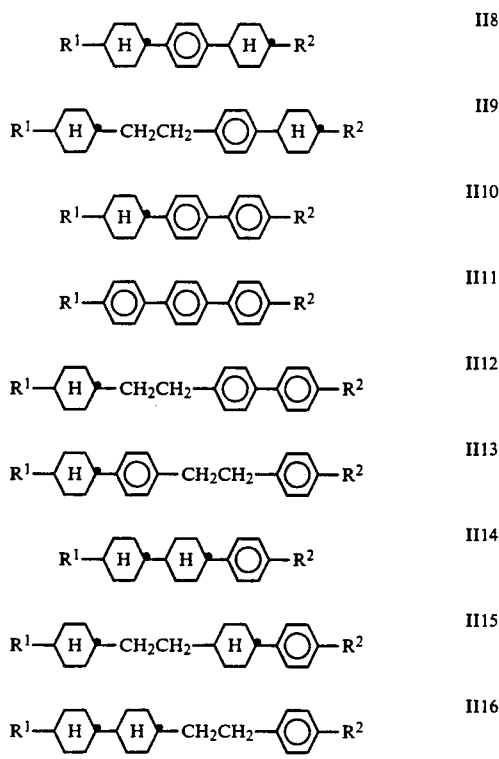

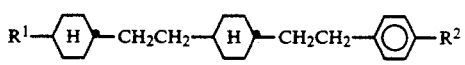 II17

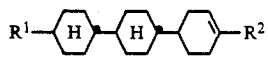 II18

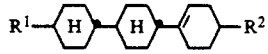 II19

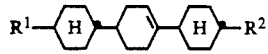 II20

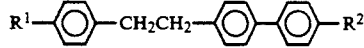 II21 in which R¹ and R² are each independently n-alkyl, n-alkoxy, n-oxaalkyl, straight-chain ω-fluoroalkyl, or n-alkenyl having up to 9 C atoms, and the 1,4-phenylene groups in II8 to II17 and II21 may each, independently of one another, also be monosubstituted by fluorine, component B additionally contains one or more compounds selected from the group comprising II22 to II27:

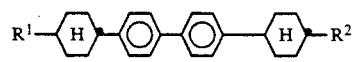 II22

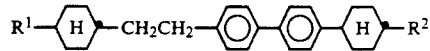 II23

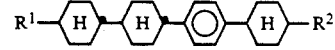 II24

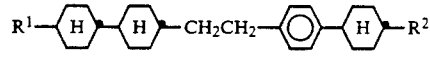 II24

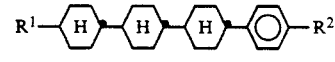 II26

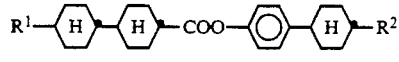 II27 in which R¹ and R² are each independently n-alkyl, n-alkoxy, n-oxaalkyl, straight-chain ω-fluoroalkyl, or n-alkenyl having up to 9 carbon atoms, and the 1,4-phenylene groups in II22 to II27 may each, independently of one another, also be monosubstituted by fluorine, component B contains one or more compounds selected from the group comprising II28 and II29

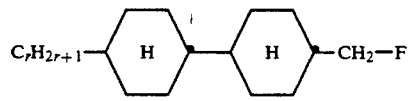 II28

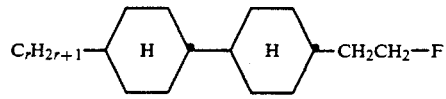 II29 in which $C_rH_{2r+1}$ is straight-chain alkyl group having up to 7 carbon atoms, i.e., r is 1 to 7, the liquid-crystal mixture contains, in addition to components A, B, C and D, additionally one or more compounds selected from the group comprising III and IV:

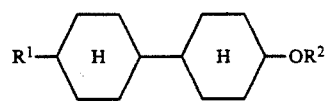 III

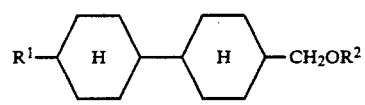 IV in which R¹ and R² are each independently n-alkyl, n-alkoxy, n-oxaalkyl, straight-chain ω-fluoroalkyl, or n-alkenyl having up to 9 carbon atoms, the liquid-crystal mixture contains, in addition to the compounds A, B, C and D, additionally one or more compounds selected from the group comprising V and VI:

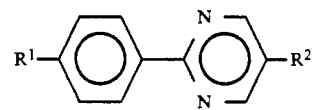 V

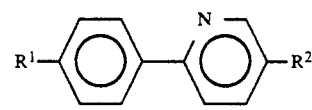 VI in which R¹ and R² are each independently n-alkyl, n-alkoxy, n-oxaalkyl, straight-chain ω-fluoroalkyl, or n-alkenyl having up to 9 carbon atoms, component C contains one or more compounds selected from the group comprising VII to XI:

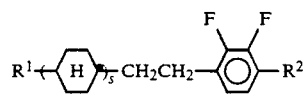 VII

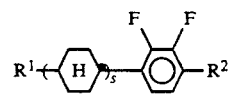 VIII

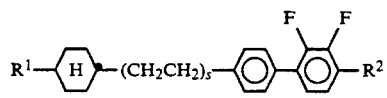 IX

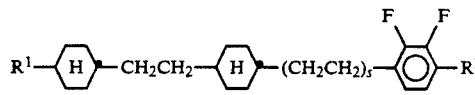 X

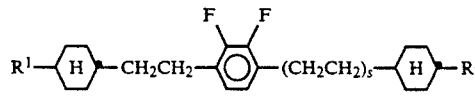 XI in which R¹ and R² are each independently n-alkyl, n-alkoxy, n-oxaalkyl, straight-chain ω-fluoroalkyl, or n-alkenyl having up to 9 carbon atoms, and is 0 or 1 component B contains one or more compounds selected from the group comprising XII to XIV:

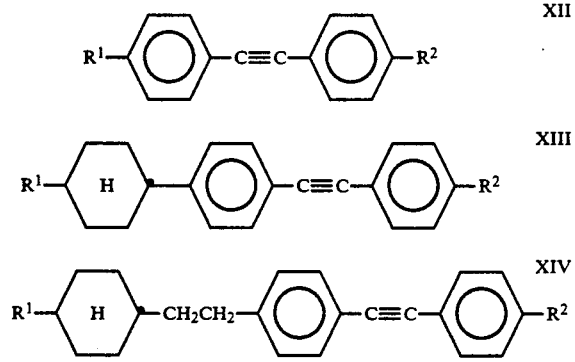

in which $R^1$ and $R^2$ are each independently n-alkyl, n-alkoxy, n-oxaalkyl, straight-chain ω-fluoroalkyl, or n-alkenyl having up to 9 carbon atoms.

Preference is given to mixtures which contain exclusively compounds of the formulae IIa to IIh (group A), component C and component D, i.e., contain no compounds of component B.

The preferred mixtures containing terminally halogenated compounds of the formulae IIa to IIk (X=F, Cl, —CF$_3$, —CHF$_2$, —OCF$_3$ or —OCHF$_2$) have particularly favorable parameter combinations and simultaneously a broad d/p window.

Liquid-crystal mixtures according to the invention whose component A further contains at least one compound of the formula T3

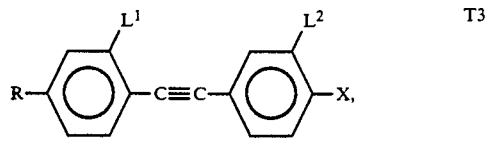

in which

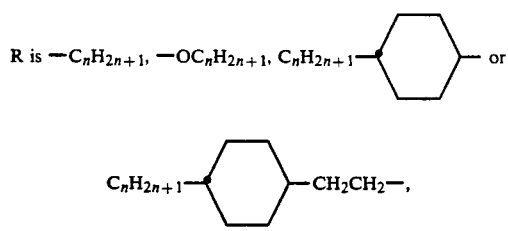

n is an integer from 1 to 15,
$L^1$ and $L^2$ are each, independently of one another, H or F, and
X is F, Cl or OCF$_3$, are preferred.
In particular those mixtures which contain a compound of the formula T3 and a compound of the formulae IId1-IId2, IIa1-IIa3 and/or IIf1-IIf3 have favorable values for the threshold voltage $V_{10/0/20}$ and the flow viscosity ω and are characterized by relatively high or high values for the optical anisotropy. Since, due to the relatively high value for Δn, the layer thickness d can be chosen to be relatively small, displays driven using these particularly preferred mixtures are generally characterized by favorable values for the switch-on and/or switch-off times $t_{on}$ and/or $t_{off}$. These mixtures are preferred.

The mixtures according to the invention are distinguished, in particular when SLCDs having high layer thicknesses are used, by very low total switching times ($=t_{on}+t_{off}$).

Low total switching times are, in particular, an important criterion for SLCDs when used as displays in laptops in order to be able to display cursor movements without interference.

A wide range of chiral dopes, some of which are commercially available, are available to a person skilled in the art for component D. Their choice is not crucial per se. Suitable chiral dopants are disclosed in, for example, DE 35 23 185.

The liquid-crystal mixtures used in the SLCDs according to the invention are dielectrically positive with Δε≧1. Particular preference is given to liquid-crystal mixtures where Δε is ≧3 and very particularly to those where Δε is ≧5.

The liquid-crystal mixtures according to the invention have favorable values for the threshold voltage $V_{10/0/20}$ and for the flow viscosity η. If the value for the optical path difference d.Δn is specified, the value for the layer thickness d is determined by the optical anisotropy Δn. In particular at relatively high values for d.Δn, the use of liquid-crystal mixtures according to the invention having a relatively high value for the optical anisotropy is generally preferred since the value for d can then be chosen to be relatively small, which results in more favorable values for the switching times. However, those liquid-crystal displays according to the invention which contain liquid-crystal mixtures according to the invention having relatively small values for Δn are also characterized by advantageous values for the switching times. The liquid-crystal mixtures according to the invention are furthermore characterized by advantageous values for the steepness of the electrooptical characteristic line and can be operated at high multiplex rates. In addition, the liquid-crystal mixtures according to the invention have high stability and favorable values for the electrical resistance and the frequency dependence of the threshold voltage. The liquid-crystal displays according to the invention have a broad operating temperature range and good angle dependence of the contrast.

The construction of the liquid-crystal display elements according to the invention from polarizers, electrode base plates and electrodes with a surface treatment such that the preferential alignment (director) of the liquid-crystal molecules in each case adjacent thereto is usually twisted by a value of from 160° to 360° relative to one another form one electrode to the next, corresponds to the structure which is conventional for display elements of this type. The term conventional structure here is broadly drawn and also includes all derivatives and modifications of the supertwist cell, in particular also matrix display elements, and the display elements of DE-A 2 748 738, which contain additional magnets. The surface tilt angle at the two outer plates may be identical or different. Identical tilt angles are preferred.

An essential difference of the display elements according to the invention to those customary hitherto and based on the twisted nematic cell is, however, the choice of the liquid-crystal components of the liquid-crystal layer.

The liquid-crystal mixtures which can be used according to the invention are prepared in a manner which is known per se.

In general, the desired amount of the components used in a lesser amount is dissolved in the components making up the principal constituent, expediently at elevated temperature. It is also possible to mix solutions of the components in an organic solvent, for example in acetone, chloroform or methanol, and, after mixing, to remove the solvent again, for example by distillation.

The dielectrics may also contain further additives which are known to a person skilled in the art and are described in the literature. For example, 0–15% of pleochroic dyes may be added.

In order to match the materials parameters to the respective display parameters, the media according to the invention are prepared, in a particularly preferred embodiment, by mixing so-called "multibottle systems". A "two- or multibottle system" usually allows the required optical anisotropy to be adjusted in accordance with the layer thickness of the SLCD displays.

In addition, the "multibottle system" according to the invention allows the steepness and response behavior to be adjusted at a prespecified threshold voltage by adjusting the elastic constants, in particular $K_3/K_1$.

Accordingly, the invention furthermore relates to a liquid-crystalline medium based on component A, containing one or more compounds of the formula IIa or IIb, one or more compounds of the formulae IIc to IIe and one or more compounds of the formulae IIf to IIh, the medium being in the form of a ready-to-use set comprising two or more, preferably four, components of identical threshold voltage whose one component has an optical anisotropy of from 0.100–0.110, and the other has an optical anisotropy of from 0.170 to 0.180.

Particular preference is given to a 4-component set in which all 4 components have approximately the same threshold voltage and in each case two components have the same optical anisotropy but different $K_3/K_1$ values. This "4-bottle system" can be used to prepare, in a targeted manner, mixtures having all parameters, i.e. having identical threshold voltage, optical anisotropy between 0.100 and 0.180 and $K_3/K_1$ values between 1.0 and 1.6.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, and of corresponding application Federal Republic of Germany P 40 39 052.7, filed Dec. 7, 1990, Federal Republic of Germany P 41 11 964.9, filed Apr. 12, 1991, and Federal Republic of Germany P 41 19 292.3, filed Jun. 12, 1991, are hereby incorporated by reference.

EXAMPLES

The examples below are intended to illustrate the invention without representing a limitation.

The following abbreviations are used:

| | |
|---|---|
| S-N | smectic-nematic phase transition temperature, |
| N-I | nematic-isotropic phase transition temperature |
| c.p. | clearing point, |
| visc. | viscosity (mPa.s), |
| $T_{on}$ | time from switching on until 90% of the maximum contrast is achieved, |
| $T_{off}$ | time from switching off until 10% of the maximum contrast is achieved. |

The SLCD is operated in multiplex mode (multiplex ratio 1:240, bias 1:16, operating voltage 18.5 volts).

Above and below, all temperatures are indicated in °C. The percentages are per cent by weight. The values for the switching times and viscosities relate to 20° C.

EXAMPLE 1

An SLCD of the STN type having the following parameters:

| | |
|---|---|
| twist angle | 240° |
| pitch angle | 5° |
| d | 7.7 μm | and containing a liquid-crystal mixture having the following parameters:

| | |
|---|---|
| clearing point | 72° C. |
| Δn: | 0.1152 | and comprising a base mixture comprising

| | |
|---|---|
| 7.0% | of PCH-2 |
| 18.0% | of PCH-3 |
| 10.0% | of PCH-4 |
| 3.0% | of ME2N.F |
| 4.0% | of PYP-31 |
| 4.0% | of PYP-32 |
| 5.0% | of PYP-33 |
| 4.0% | of PYP-34 |
| 7.0% | of CCP-2OCF$_3$ |
| 7.0% | of CCP-3OCF$_3$ |
| 7.0% | of CCP-4OCF$_3$ |
| 7.0% | of CCP-5OCF$_3$ |
| 4.0% | of ECCP-33 |
| 5.0% | of ECCP-3F |
| 5.0% | of ECCP-5F |
| 3.0% | of CCPC-33 | and a chiral component (2-octyl p-(p-n-hexylbenzoyloxy)benzoate) has the following switching times:

| | |
|---|---|
| $t_{on}$ | 260 ms |
| $t_{off}$ | 240 ms |
| $t_{on} + t_{off}$ | 500 ms |

EXAMPLE 2

An SLCD of the STN type having the following parameters:

| | |
|---|---|
| twist angle | 240° C. |
| pitch angle | 5° |
| d | 8.0 μm | and containing a liquid-crystal mixture having the following parameters:

| | |
|---|---|
| clearing point | 71° |
| Δn | 0.1126 | and comprising a base mixture comprising

| | |
|---|---|
| 7.0% | of PCH-2 |
| 18.0% | of PCH-3 |
| 5.0% | of PCH-4 |
| 4.0% | of PYP-2F |
| 4.0% | of PYP-3F |
| 3.0% | of PYP-31 |
| 3.0% | of PYP-32 |
| 4.0% | of PYP-33 |
| 4.0% | of PYP-34 |
| 8.0% | of CCP-2OCF$_3$ |
| 8.0% | of CCP-3OCF$_3$ |
| 7.0% | of CCP-4OCF$_3$ |
| 7.0% | of CCP-5OCF$_3$ |
| 7.0% | of ECCP-3F |
| 7.0% | of ECCP-5F |
| 4.0% | of CCPC-33 | and a chiral component (cf. Example 1) has the following switching times:

| | |
|---|---|
| $t_{on}$ | 260 ms |
| $t_{off}$ | 290 ms |
| $t_{on} + t_{off}$ | 550 ms |

EXAMPLE 3

An SLCD of the STN type having the following parameters:

| | |
|---|---|
| twist angle | 240° C. |
| pitch angle | 5° |
| d | 7.9 μm | containing a liquid-crystal mixture having the following parameters:

| | |
|---|---|
| clearing point | 70° |
| Δn | 0.1098 | and comprising a base mixture comprising

| | |
|---|---|
| 5.0% | of PCH-2 |
| 20.0% | of PCH-3 |
| 5.0% | of PCH-4 |
| 4.0% | of PYP-2F |
| 4.0% | of PYP-3F |
| 2.0% | of PYP-31 |
| 3.0% | of PYP-32 |
| 4.0% | of PYP-33 |
| 4.0% | of PYP-34 |
| 3.0% | of CCH-303 |
| 7.0% | of CCP-2OCF$_3$ |
| 7.0% | of CCP-3OCF$_3$ |
| 7.0% | of CCP-4OCF$_3$ |
| 7.0% | of CCP-5OCF$_3$ |
| 7.0% | of ECCP-3F |
| 7.0% | of ECCP-5F |
| 4.0% | of CCPC-33 | and a chiral component (cf. Example 1) has the following switching times:

| | |
|---|---|
| $t_{on}$ | 300 ms |
| $t_{off}$ | 310 ms |
| $t_{on} + t_{off}$ | 610 ms. |

EXAMPLE 4

A liquid-crystal mixture comprising:

| | | |
|---|---|---|
| PCH-2 | 6.0% | S < −20 N 71 I |
| PCH-3 | 19.0% | |
| PCH-4 | 5.0% | Δn 0.1068 |
| PCH-301 | 7.0% | |
| CCP-2OCF$_3$ | 8.0% | viscosity at 20° 15 mPa.s |
| CCP-3OCF$_3$ | 8.0% | |
| CCP-4OCF$_3$ | 7.0% | |
| CCP-5OCF$_3$ | 7.0% | |
| PYP-2F | 4.0% | |
| PYP-3F | 4.0% | |
| PYP-31 | 3.0% | |
| PYP-33 | 4.0% | |
| ECCP-3F | 7.0% | |
| ECCP-5F | 7.0% | |
| CCPC-33 | 4.0% | | and a chiral component (cf. Example 1) gives a threshold voltage of 1.80 V in an SLCD of the STN type (parameters cf. Example 1).

EXAMPLE 5

A liquid-crystal mixture comprising:

| | | |
|---|---|---|
| PCH-2 | 8.0% | S < −40 N 73 I |
| PCH-3 | 20.0% | |
| PCH-4 | 7.0% | Δn 0.1073 |
| PCH-5 | 4.0% | |
| PYP-32 | 5.0% | viscosity at 20° 17 mPa.s |
| PYP-33 | 4.0% | |
| CCP-2OCF$_3$ | 8.0% | |
| CCP-3OCF$_3$ | 8.0% | |
| CCP-4OCF$_3$ | 7.0% | |
| CCP-5OCF$_3$ | 7.0% | |
| ECCP-3OCF$_3$ | 5.0% | |
| ECCP-5OCF$_3$ | 5.0% | |
| ECCP-3F.F | 6.0% | |
| ECCP-5F.F | 6.0% | | and a chiral component (cf. Example 1) gives a threshold voltage of 1.89 V in an SLCD of the STN type (parameters cf. Example 1).

EXAMPLE 6

A liquid-crystal mixture comprising:

| | | |
|---|---|---|
| PCH-3 | 10.0% | S < −30 N 73 I |
| K6 | 7.0% | |
| K9 | 8.0% | Δn 0.1720 |
| PCH-301 | 11.0% | |
| PYP-31 | 4.0% | viscosity at 20° 19 mPa.s |
| PYP-32 | 5.0% | |
| PYP-33 | 4.0% | |
| PTP-20F | 6.0% | |
| PTP-40F | 6.0% | |
| CCP-3OCF$_3$ | 6.0% | |
| CCP-5OCF$_3$ | 6.0% | |
| ECCP-3OCF$_3$ | 5.0% | |
| ECCP-5OCF$_3$ | 5.0% | |
| CPTP-3OCF$_3$ | 6.0% | |
| CPTP-5OCF$_3$ | 6.0% | |
| CPTP-302 | 5.0% | | and a chiral component (cf. Example 1) gives a threshold voltage of 1.91 V in an SLCD of the STN type (parameters cf. Example 1).

EXAMPLE 7

A liquid-crystal mixture comprising:

| PCH-3 | 20.0% | clearing point | +91° C. |
|---|---|---|---|
| PCH-5 | 8.0% | Δn | +0.1280 |
| PYP-3F | 3.0% | | |
| PYP-5F | 3.0% | | |
| PYP-31 | 5.0% | | |
| PYP-32 | 5.0% | | |
| PYP-33 | 5.0% | | |
| CCP-20CF$_3$ | 6.0% | | |
| CCP-30CF$_3$ | 6.0% | | |
| CCP-40CF$_3$ | 6.0% | | |
| CCP-50CF$_3$ | 6.0% | | |
| ECCP-30CF$_3$ | 6.0% | | |
| ECCP-50CF$_3$ | 6.0% | | |
| CBC-33F | 5.0% | | |
| CBC-53F | 5.0% | | |
| CBC-55F | 5.0% | | | and a chiral component (cf. Example 1) gives a threshold voltage of 2.13 V in an SLCD of the STN type (parameters cf. Example 1).

EXAMPLE 8

A liquid-crystal mixture comprising:

| PCH-3 | 16.0% | clearing point | +85° C. |
|---|---|---|---|
| PCH-5 | 7.0% | Δn | +0.1182 |
| PYP-3F | 5.0% | | |
| PYP-5F | 5.0% | | |
| PCH-302 | 4.0% | | |
| PYP-31 | 5.0% | | |
| PYP-32 | 5.0% | | |
| PYP-33 | 5.0% | | |
| CCP-20CF$_3$ | 6.0% | | |
| CCP-30CF$_3$ | 6.0% | | |
| CCP-40CF$_3$ | 6.0% | | |
| CCP-50CF$_3$ | 6.0% | | |
| ECCP-30CF$_3$ | 6.0% | | |
| ECCP-50CF$_3$ | 6.0% | | |
| CCPC-33 | 4.0% | | |
| CCPC-34 | 4.0% | | |
| CCPC-35 | 4.0% | | | and a chiral component (cf. Example 1) gives a threshold voltage of 2.06 V in an SLCD of the STN type (parameters cf. Example 1).

EXAMPLE 9

A liquid-crystal mixture comprising:

| PCH-3 | 10.0% | clearing point | +82° C. |
|---|---|---|---|
| PYP-3F | 10.0% | Δn | +0.1185 |
| PYP-5F | 8.0% | | |
| PCH-301 | 6.0% | | |
| PYP-31 | 5.0% | | |
| PYP-32 | 5.0% | | |
| PYP-33 | 5.0% | | |
| CCP-20CF$_3$ | 6.0% | | |
| CCP-30CF$_3$ | 6.0% | | |
| CCP-406CF$_3$ | 6.0% | | |
| CCP-50CF$_3$ | 6.0% | | |
| ECCP-30CF$_3$ | 6.0% | | |
| ECCP-50CF$_3$ | 6.0% | | |
| CCPC-33 | 5.0% | | |
| CCPC-34 | 5.0% | | |
| CCPC-35 | 5.0% | | | and a chiral component (cf. Example 1) gives a threshold voltage of 2.19 V in an SLCD of the STN type (parameters cf. Example 1).

EXAMPLE 10

A liquid-crystal mixture comprising:

| PCH-3 | 15.0% | clearing point | +86° C. |
|---|---|---|---|
| PCH-5 | 5.0% | Δn | +0.1083 |
| PCH-301 | 14.0% | | |
| CCP-20CF$_3$ | 6.0% | | |
| CCP-30CF$_3$ | 6.0% | | |
| CCP-40CF$_3$ | 6.0% | | |
| CCP-50CF$_3$ | 6.0% | | |
| ECCP-30CF$_3$ | 7.0% | | |
| ECCP-50CF$_3$ | 7.0% | | |
| PYP-3F | 8.0% | | |
| PYP-5F | 7.0% | | |
| CCPC-33 | 5.0% | | |
| CCPC-34 | 3.0% | | |
| CCPC-35 | 5.0% | | | and a chiral component (cf. Example 1) gives a threshold voltage of 2.15 V in an SLCD of the STN type (parameters cf. Example 1).

EXAMPLE 11

A liquid-crystal mixture comprising:

| PCH-3 | 19.0% | clearing point | +88° C. |
|---|---|---|---|
| PCH-301 | 4.0% | Δn | +0.1143 |
| CCP-20CF$_3$ | 6.0% | | |
| CCP-30CF$_3$ | 6.0% | | |
| CCP-40CF$_3$ | 6.0% | | |
| CCP-50CF$_3$ | 6.0% | | |
| ECCP-30CF$_3$ | 7.0% | | |
| ECCP-50CF$_3$ | 7.0% | | |
| PYP-3F | 8.0% | | |
| PYP-5F | 7.0% | | |
| PYP-32 | 5.0% | | |
| PYP-33 | 5.0% | | |
| CCPC-33 | 5.0% | | |
| CCPC-34 | 4.0% | | |
| CCPC-35 | 5.0% | | | and a chiral component (cf. Example 1).

EXAMPLE 12

A liquid-crystal mixture comprising:

| PCH-3 | 16.0% | clearing point | +84° C. |
|---|---|---|---|
| PYP-3F | 5.0% | Δn | +0.1774 |
| K9 | 8.0% | | |
| PCH-301 | 7.0% | | |
| PYP-31 | 4.0% | | |
| PYP-32 | 4.0% | | |
| PYP-33 | 4.0% | | |
| PTP-102 | 5.0% | | |
| PTP-201 | 5.0% | | |
| CCP-30CF$_3$ | 6.0% | | |
| CCP-50CF$_3$ | 6.0% | | |
| ECCP-30CF$_3$ | 6.0% | | |
| ECCP-50CF$_3$ | 6.0% | | |
| CPTP-301 | 6.0% | | |
| CPTP-302 | 6.0% | | |
| CPTP-303 | 6.0% | | |

EXAMPLE 13

A liquid-crystal mixture comprising:

| PCH-3F | 12.0% | N 83 I |
|---|---|---|

| PCH-5F | 12.0% | Δn 0.1050 |
| PCH-302 | 9.0% | |
| CCP-20CF$_3$ | 5.0% | |
| CCP-30CF$_3$ | 5.0% | |
| CCP-40CF$_3$ | 4.0% | |
| CCP-50CF$_3$ | 5.0% | |
| ECCP-30CF$_3$ | 4.0% | |
| ECCP-50CF$_3$ | 4.0% | |
| ECCP-3F.F | 10.0% | |
| ECCP-5F.F | 10.0% | |
| CCH-303 | 8.0% | |
| CBC-33F | 4.0% | |
| CBC-53F | 4.0% | |
| CBC-55F | 4.0% | | and a chiral component (cf. Example 1) gives a threshold voltage of 2.01 V in an SLCD of the STN type (parameters cf. Example 1).

EXAMPLE 14

A "4-bottle system" is produced comprising components A, B, C and D:

| A | | B | |
|---|---|---|---|
| PCH-2 | 8.0% | PCH-3 | 10.0% |
| PCH-3 | 20.0% | K6 | 7.0% |
| PCH-4 | 7.0% | K9 | 8.0% |
| PCH-5 | 4.0% | PCH-301 | 11.0% |
| PYP-32 | 5.0% | PYP-31 | 4.0% |
| PYP-33 | 4.0% | PYP-32 | 5.0% |
| CCP-20CF$_3$ | 8.0% | PYP-33 | 4.0% |
| CCP-30CF$_3$ | 8.0% | PTP-20F | 6.0% |
| CCP-40CF$_3$ | 7.0% | PTP-40F | 6.0% |
| CCP-50CF$_3$ | 7.0% | CCP-30CF$_3$ | 6.0% |
| ECCP-30CF$_3$ | 5.0% | CCP-50CF$_3$ | 6.0% |
| ECCP-50CF$_3$ | 5.0% | ECCP-30CF$_3$ | 5.0% |
| ECCP-3F.F | 6.0% | ECCP-50CF$_3$ | 5.0% |
| ECCP-5F.F | 6.0% | CPTP-30CF$_3$ | 6.0% |
| | | CPTP-50CF$_3$ | 6.0% |
| | | CPTP-302 | 5.0% |

| C | | D | |
|---|---|---|---|
| PCH-2 | 5.0% | PCH-3 | 18.0% |
| PCH-3 | 20.0% | PCH-5 | 7.0% |
| PCH-5 | 8.0% | K6 | 10.0% |
| PCH-301 | 16.0% | PCH-301 | 14.0% |
| ME2N.F | 3.0% | PCH-302 | 8.0% |
| ME3N.F | 3.0% | ME2N.F | 2.0% |
| CCP-20CF$_3$ | 5.0% | ME3N.F | 2.0% |
| CCP-30CF$_3$ | 5.0% | PTP-102 | 6.0% |
| CCP-40CF$_3$ | 5.0% | PTP-201 | 6.0% |
| CCP-50CF$_3$ | 5.0% | CPTP-301 | 6.0% |
| ECCP-30CF$_3$ | 5.0% | CPTP-302 | 5.0% |
| ECCP-50CF$_3$ | 5.0% | CPTP-303 | 6.0% |
| ECCP-3F.F | 5.0% | ECCP-3F | 3.0% |
| ECCP-5F.F | 5.0% | CCP-30CF$_3$ | 4.0% |
| CBC-53 | 5.0% | CCP-50CF$_3$ | 3.0% |

Component A has the following parameters:

| S < −40 K 73 I | |
|---|---|
| Viscosity (+20° C.) | 17 mm$^2$/s |
| Δn | 0.1703 |
| Δε | 10.0 |
| V$_{th}$ | 1.89 |
| Steepness [= (V$_{th}$/V$_{10}$$^{-1}$) . 100] | 10.05% |

Component B has the following parameters:

| S < −30 C 73 I | |
|---|---|
| Viscosity (20° C.) | 19 mm$^2$/s |
| Δn | 0.1720 |
| Δε | 9.3 |
| V$_{th}$ | 1.91 |
| Steepness [= (V$_{th}$/V$_{10}$$^{-1}$) . 100] | 13.09% |
| T$_{on}$ + T$_{off}$/2 | 85 ms |

Component C has the following parameters:

| S < −40 C 74 I | |
|---|---|
| Viscosity (20° C.) | 17 mm$^2$/s |
| Δn | 0.1063 |
| Δε | 10.5 |
| V$_{th}$ | 1.86 |
| Steepness [= (V$_{th}$/V$_{10}$$^{-1}$) . 100] | 7.28% |

Component D has the following parameters:

| S < −20 C 73 I | |
|---|---|
| Viscosity (20° C.) | 18 mm$^2$/s |
| Δn | 0.1708 |
| Δε | 9.9 |
| V$_{th}$ | 1.85 |
| Steepness [= (V$_{th}$/V$_{10}$$^{-1}$) . 100] | 5.96% |
| T$_{on}$ + T$_{off}$/2 | 120 ms |

Mixing components B and D gives mixtures having the following parameters (measured in a 240° STN cell, d=6 μm):

TABLE I

| Component (%) | | Steepness | V$_{th}$ | T$_{on}$ + T$_{off}$/2 |
|---|---|---|---|---|
| B | D | (%) | (V) | (ms) |
| 25 | 25 | 10.7 | 1.87 | 100 |
| 50 | 50 | 9.5 | 1.85 | 108 |
| 75 | 75 | 8.7 | 1.82 | 115 |

Mixing of components A and B gives mixtures having the following parameters (measured in a 240° STN cell/layer thickness 6.5 μm).

TABLE II

| Component (%) | | Δn | Steepness | V$_{th}$ | T$_{on}$ + T$_{off}$/2 |
|---|---|---|---|---|---|
| A | B | Δn | (%) | (V) | (ms) |
| 37 | 63 | 0.13 | 1.88 | 11.1 | 183 |
| 50 | 50 | 0.13 | 1.90 | 11.3 | 150 |

The novel "4-bottle system" gives SLCDs with total response times of <250 ms at a layer thickness of 6 μm, <200 ms at 5 μm, <400 ms at 7 μm and <600 ms at 8 μm, and broad d/p windows even at high twist angles.

EXAMPLE 15

A "4-bottle system" is produced comprising components E, F, G and H:

| E | | F | |
|---|---|---|---|
| PCH-3 | 19.0% | PCH-3 | 8.0% |
| PCH-4 | 8.0% | K6 | 8.0% |
| PCH-5 | 8.0% | K9 | 8.0% |
| PCH-301 | 7.0% | PCH-301 | 12.0% |
| CCP-20CF$_3$ | 6.0% | PYP-31 | 5.0% |
| CCP-30CF$_3$ | 6.0% | PYP-32 | 5.0% |
| CCP-40CF$_3$ | 6.0% | PYP-33 | 5.0% |
| CCP-50CF$_3$ | 6.0% | PTP-201 | 4.0% |
| ECCP-30CF$_3$ | 7.0% | CCP-30CF$_3$ | 7.0% |
| ECCP-50CF$_3$ | 7.0% | CCP-50CF$_3$ | 7.0% |
| PYP-32 | 6.0% | ECCP-30CF$_3$ | 7.0% |
| PYP-33 | 6.0% | ECCP-50CF$_3$ | 7.0% |
| CCPC-33 | 4.0% | CPTP-301 | 6.0% |
| CCPC-34 | 4.0% | CPTP-302 | 5.0% |

-continued

| CPTP-303 | 6.0% | | |
|---|---|---|---|
| G | | H | |
| PCH-3 | 20.0% | PCH-3 | 17.0% |
| PCH-4 | 9.0% | K6 | 6.0% |
| PCH-5 | 9.0% | K9 | 7.0% |
| PCH-301 | 15.0% | PCH-301 | 20.0% |
| CCP-20CF$_3$ | 6.0% | PTP-102 | 6.0% |
| CCP-30CF$_3$ | 6.0% | PTP-201 | 6.0% |
| CCP-40CF$_3$ | 6.0% | CCP-30CF$_3$ | 6.0% |
| CCP-50CF$_3$ | 6.0% | CCP-50CF$_3$ | 6.0% |
| ECCP-30CF$_3$ | 7.0% | ECCP-30CF$_3$ | 5.0% |
| ECCP-50CF$_3$ | 7.0% | ECCP-50CF$_3$ | 5.0% |
| CBC-33F | 4.0% | CPTP-301 | 5.0% |
| CBC-53F | 5.0% | CPTP-302 | 6.0% |
| | | CPTP-303 | 5.0% |

Component E has the following parameters:

| S → N | < −40° C. |
|---|---|
| Clearing point | +83° C. |
| Viscosity (+20 ° C.) | 18 mm$^2$/s |
| Δn | 0.1110 |
| Δε | 8.8 |
| V$_{th}$ | 2.09 V |

Component F has the following parameters:

| S → N | < −30° C. |
|---|---|
| Clearing point | +86° C. |
| Viscosity (+20° C.) | 20 mm$^2$/s |
| Δn | 0.1701 |
| Δε | 8.3 |
| V$_{th}$ | 2.09 V |

Component G has the following parameters:

| S → N | < −40° C. |
|---|---|
| Clearing point | +85° C. |
| Viscosity (+20° C.) | 17 mm$^2$/s |
| Δn | 0.1076 |
| Δε | 8.6 |
| V$_{th}$ | 2.18 V |

Component H has the following parameters:

| S → N | < −30° C. |
|---|---|
| Clearing point | +84° C. |
| Viscosity (+20° C.) | 16 mm$^2$/s |
| Δn | 0.01705 |
| Δε | 8.3 |
| V$_{th}$ | 2.12 V |

Mixing components E and F gives mixtures having the following parameters:

TABLE 1

| Component (%) | | Viscosity (° C.) [mm$^2$/s] | Δn | Δε | V$_{th}$ [V] | $\frac{T_{on} + T_{off}}{2}$ [ms]$^2$ |
|---|---|---|---|---|---|---|
| E | F | | | | | |
| 75 | 25 | 18.1 | 0.1255 | 8.7 | 2.09 | 215 |
| 50 | 50 | 18.7 | 0.1397 | 8.6 | 2.09 | 155 |
| 25 | 75 | 19.3 | 0.1546 | 8.5 | 2.09 | 125 |

Mixing components F and H gives mixtures having the following parameters:

TABLE 2

| Component (%) | | Viscosity (° C.) [mm$^2$/s] | Δn | Δε | V$_{th}$ [V] | $\frac{T_{on} + T_{off}}{2}$ [ms]$^2$ |
|---|---|---|---|---|---|---|
| F | H | | | | | |
| 75 | 25 | 18.6 | 0.1699 | 8.3 | 2.10 | 110 |
| 50 | 50 | 17.5 | 0.1697 | 8.3 | 2.12 | 115 |
| 25 | 75 | 17.0 | 0.1701 | 8.3 | 2.12 | 130 |

| PCH-53: | trans-1-p-propylphenyl-4-pentylcyclohexane |
|---|---|
| I-32: | 1-(trans-4-propylcyclohexyl)-2-(4'-ethyl-2'-fluorobiphenyl-4-yl)ethane |
| I-35: | 1-(trans-4-propylcyclohexyl)-2-(4'-pentyl-2'-fluorobiphenyl-4-yl)ethane |
| BCH-32: | 4-ethyl-4'-(trans-4-propylcyclohexyl)-biphenyl |
| BCH-52: | 4-ethyl-4'-(trans-4-pentylcyclohexyl)-biphenyl |
| CCH-303: | trans,trans-4-propoxy-4'-propylcyclohexyl-cyclohexane |
| CCH-501: | trans,trans-4-methoxy-4'-pentylcyclo-hexylcyclohexane |
| CH-35: | trans-4-pentylcyclohexyl trans,trans-4-propylcyclohexylcyclohexanecarboxylate |
| CH-43: | trans-4-propylcyclohexyl trans,trans-4-butylcyclohexylcyclohexanecarboxylate |
| CH-45: | trans-4-pentylcyclohexyl trans,trans-4-butylcyclohexylcyclohexanecarboxylate |
| PCH-302: | trans-1-p-ethoxyphenyl-4-propylcyclohexane |
| PCH-303: | trans-1-p-propoxyphenyl-4-propylcyclohexane |
| PCH-30: | trans-1-p-butoxyphenyl-4-propylcyclohexane |
| CCH-502: | trans,trans-4-ethoxy-4'-pentylcyclo-hexylcyclohexane |
| ECCP-32: | 1-[trans-4-(trans-4-propylcyclohexyl)cyclohexyl]-2-(p-ethylphenyl)ethane |
| ECCP-31: | 1-[trans-4-(trans-4-propylcyclohexyl)cyclohexyl]-2-(p-methylphenyl)ethane |
| ECCP-35: | 1-[trans-4-(trans-4-propylcyclohexyl)-cyclohexyl]-2-(p-pentylphenyl)ethane |
| PCH-501: | trans-1-p-methoxyphenyl-4-pentylcyclohexane |
| PCH-502: | trans-1-p-ethoxyphenyl-4-pentylcyclohexane |
| CP-33: | p-propylphenyl trans,trans-4-propylcyclo-hexylcyclohexanecarboxylate |
| CP-35: | p-pentylphenyl trans,trans-4-propylcyclo-hexylcyclohexanecarboxylate |
| CP-43: | p-propylphenyl trans,trans-4-butylcyclo-hexylcyclohexanecarboxylate |
| CP-45: | p-pentylphenyl trans,trans-4-butylcyclo-hexylcyclohexanecarboxylate |
| PTP-40F: | 4-butoxy-4'-fluorotolan |
| PTP-50F: | 4-pentoxy-4'-fluorotolan |
| PTP-20F: | 4-ethoxy-4'-fluorotolan |
| PCH-301: | trans-1-p-methoxyphenyl-4-propylcyclohexane |
| CCH-301: | trans,trans-4-methoxy-4'-propylcyclo-hexylcyclohexane |
| CBC-33F: | 4,4'-bis(trans-4-propylcyclohexyl)-2-fluorobiphenyl |
| CBC-55F: | 4,4'-bis(trans-4-pentylcyclohexyl)-2-fluorobiphenyl |
| CBC-53F: | 4-(trans-4-pentylcyclohexyl)-4'-(trans-4-propylcyclohexyl)-2-fluorobiphenyl |
| CBC-33: | 4,4'-bis(trans-4-propylcyclohexyl)biphenyl |
| CBC-55: | 4,4'-bis(trans-4-pentylcyclohexyl)biphenyl |
| CBC-53: | 4-(trans-4-pentylcyclohexyl)-4'-(trans-4-propylcyclohexyl)biphenyl |
| ECCP-33: | 1-[trans-4-(trans-4-propylcyclohexyl)-cyclohexyl]-3-(p-propylphenyl)ethane |
| CCH-51F: | trasn,trans-4-fluoromethyl-4'-pentylcyclo-hexylcyclohexane |
| CCH-31F: | trans,trans-4-fluoromethyl-4'-propylcyclo-hexylcyclohexane |
| PTP-102: | 4-methyl-4'-ethoxytolan |
| PTP-201: | 4-methoxy-4'-ethyltolan |
| CPTP-301: | 4-(trans-4-propylcyclohexyl)-4'-methoxytolan |
| CPTP-302: | 4-(trans-4-propylcyclohexyl)-4'-ethoxytolan |
| CPTP-303: | 4-(trans-4-propylcyclohexyl)-4'-propoxytolan |
| CPTP-30CF$_3$: | 4-(trans-4-propylcyclohexyl)-4'-trifluoro- |

TABLE 2-continued

| | |
|---|---|
| CPTP-50CF$_3$: | 4-(trans-4-propylcyclohexyl)-4'-trifluoromethoxytolan |
| PCH-5F: | trans-1-p-fluorophenyl-4-pentylcyclohexane |
| PCH-6F: | trans-1-p-fluorophenyl-4-hexylcyclohexane |
| PCH-7F: | trans-1-p-fluorophenyl-4-hetylcyclohexane |
| EPCH-20CF$_3$: | 1-(trans-4-ethylcyclohexyl)-2-(p-trifluoromethoxyphenyl)ethane |
| PCH-3F: | trans-1-p-fluorophenyl-4-propylcyclohexane |
| EPCH-30CF$_3$: | 1-(trans-4-propylcyclohexyl)-2-(p-trifluoromethoxyphenyl)ethane |
| EPCH-50CF$_3$: | 1-(trans-4-pentylcyclohexyl)-2-(p-trifluoromethoxyphenyl)ethane |
| EPCH-70CF$_3$: | 1-(trans-4-heptylcyclohexyl)-2-(p-trifluoromethoxyphenyl)ethane |
| PCH-30CF$_3$: | trans-1-p-trifluoromethoxyphenyl-4-propylcyclohexane |
| PCH-50CF$_3$: | trans-1-p-trifluoromethoxyphenyl-4-pentylcyclohexane |
| ECCP-30CF$_3$: | 1-[trans-4-(trans-4-propylcyclohexyyl)-cyclohexyl]-2-(p-trifluoromethoxyphenyl)-ethane |
| ECCP-50CF$_3$: | 1-[trans-4-(trans-4-pentylcyclohexyl)-cyclohexyl]-2-(p-trifluoromethoxyphenyl)-ethane |
| CCP-20CF$_3$: | p-trans-4-(trans-4-ethylcyclohexyl)cyclohexyl]trifluoromethoxybenzene |
| CCP-30CF$_3$: | p-[trans-4-(trans-4-propylcyclohexyl)-cyclohexyl]trifluoromethoxybenzene |
| CCP-40CF$_3$: | p-[trans-4-(trans-4-butylcyclohexyl)cyclohexyl]trifluoromethoxybenzene |
| CCP-50CF$_3$: | p-[trans-4-(trans-4-pentylcyclohexyl)-cyclohexyl]trifluoromethoxybenzene |
| BCH-30CF$_3$: | 4-trifluoromethoxy-4'-(trans-4-propyl-cyclohexyl)biphenyl |
| ECCP-3F.F: | 1-[trans-4-(trans-4-propylcyclohexyl)-cyclohexyl]-2-(3,4-difluorophenyl)ethane |
| ECCP-5F.F: | 1-[trans-4-(trans-4-pentylcyclohexyl)-cyclohexyl]-2-(3,4-difluorophenyl)ethane |
| CCP-3F.F: | 4-[trans-4-(trans-4-propylcyclohexyl)-cyclohexyl]-1,2-difluorobenzene |
| CCP-5F.F: | 4-[trans-4-(trans-4-pentylcyclohexyl)-cyclohexyl]-1,2-difluorobenzene |
| D-302FF: | 2,3-difluoro-4-ethoxyphenyl trans-4-propylcyclohexyl carboxylate |
| D-502FF: | 2,3-difluoro-4-ethoxyphenyl trans-4-pentylcyclohexyl carboxylate |
| CCP-3F: | 4-[trans-4-(trans-4-propylcyclohexyl)cyclohexyl]fluorobenzene |
| ECCP-3F: | 1-[trans-4-(trans-4-propylcyclohexyl)-cyclohexyl]-2-(p-fluorophenyl)ethane |
| ECCP-5F: | 1-[trans-4-(trans-4-pentylcyclohexyl)-cyclohexyl]-2-(p-fluorophenyl)ethane |
| CP-3F: | p-fluorophenyl trans-4-(trans-4-propylcyclohexyl)cyclohexanecarboxylate |
| CP-5F: | p-fluorophenyl trans-4-(trans-4-propylcyclohexyl)cyclohexanecarboxylate |
| PYP-31: | 2-p-methylphenyl-5-propylpyrimidine |
| PYP-32: | 2-p-ethylphenyl-5-propylpyrimidine |
| PYP-33: | 2-p-propylphenyl-5-propylpyrimidine |
| PYP-34: | 2-p-butylphenyl-5-propylpyrimidine |
| PYP-2F: | 2-p-fluorophenyl-5-ethylpyrimidiene |
| PYP-3F: | 2-p-fluorophenyl-5-propylpyrimidiene |
| PYP-5F: | 2-p-fluorophenyl-5-pentylpyrimidiene |
| PYP-6F: | 2-p-fluorophenyl-5-hexylpyrimidine |
| PYP-7F: | 2-p-fluorophenyl-5-heptylpyrimidiene |
| PYP-30CF$_3$: | 2-p-trifluoromethoxyphenyl-5-propylpyrimidine |
| PYP-50CF$_3$: | 2-p-trifluoromethoxyphenyl-5-pentylpyrimidine |
| PYP-70CF$_3$: | 2-p-trifluoromethoxyphenyl-5-heptylpyrimidine |
| PCH-3: | p-trans-4-propylcyclohexylbenzonitrile |
| PCH-2: | p-trans-4-ethylcyclohexylbenzonitrile |
| PCH-4: | p-trans-4-butylcyclohexylbenzonitrile |
| PCH-5: | p-trans-4-pentylcyclohexylbenzonitrile |
| ECCP-3: | 1-trans-4-(trans-4-propylcyclohexyl)cyclohexyl-2-(p-cyanophenyl)ethane |
| ECCP-3CF$_3$: | 1-trans-4-(trans-4-propylcyclohexyl)cyclohexyl-2-(p-trifluoromethylphenyl)ethane |
| PTP35: | 4-propyl-4'-pentyltolan |
| PTP45: | 4-butyl-4'-pentyltolan |
| BCH-52F: | 4-(trans-4-pentylcyclohexyl)-2-fluoro-4'-ethylbiphenyl |
| CP-302FF: | 2,3-difluoro-4-ethoxyphenyl trans-4-(trans-4-propylcyclohexyl)cyclohexanecarboxylate |
| PCH-301: | trans-1-p-methoxyphenyl-4-propylcyclohexane |
| PCH-401: | trans-1-p-methoxyphenyl-4-butylcyclohexane |
| D-302: | 4-ethoxyphenyl trans-4-propylcyclohexyl-carboxylate |
| D-402: | 4-ethoxyphenyl trans-4-butylcyclohexyl-carboxylate |
| CCPC-33: | 4-(4-trans-propylcyclohexyl)phenyl trans,trans-propylcyclohexylcyclohexane-carboxylate |
| CCPC-34: | 4-(4-trans-butylcyclohexyl)phenyl trans,trans-4-propylcyclohexylcyclohexane-carboxylate |
| CCPC-35: | 4-(4-trans-pentylcyclohexyl)phenyl trans,trans-4-propylcyclohexylcyclohexane-carboxylate |
| K6: | 4'-ethyl-4-cyanbiphenyl |
| K9: | 4'-propyl-4-cyanbiphenyl |
| ME2N.F: | 4-cyano-3-fluorophenyl p-ethylbenzoate |
| ME3N.F: | 4-cyano-3-fluorophenyl p-propylbenzoate |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A supertwist liquid-crystal display comprising:
   two plane-parallel outer plates which, together with a frame, form a cell;
   a nematic liquid-crystal mixture of positive dielectric anisotropy present in said cell;
   electrode layers with superposed alignment layers on the insides of said outer plates;
   a pitch angle between the longitudinal axis of the molecules at the surface of said outer plates and the outer plates of 1–30 degrees; and
   a twist angle of said liquid-crystal mixture in said cell from alignment layer to alignment layer with a value of 100°–600°,
   wherein said nematic liquid-crystal mixture
   a) is based on component A, which contains one or more compounds of the formula IIa:

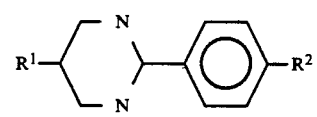

one or more compounds of the formulae IIc to IIe:

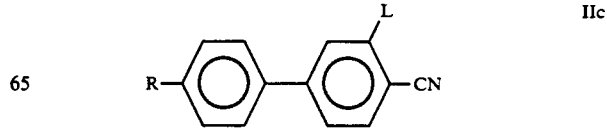

-continued

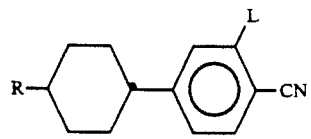
IId

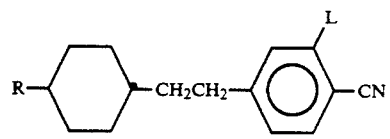
IIe and one or more compounds of the formulae IIf to IIh:

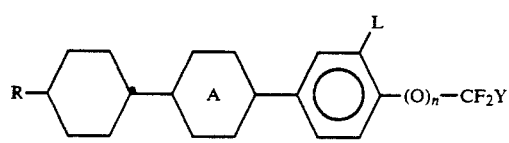
IIf

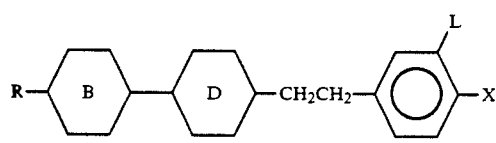
IIg

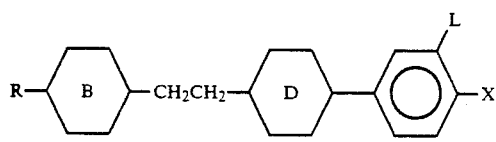
IIh in which

R¹ and R² are each, independently, alkyl wherein the total number of carbon atoms in R¹ and R² together is 4–7, R is, in each case, independently, n-alkyl, n-alkoxy or n-alkenyl having up to 9 carbon atoms,

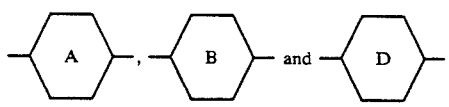

are each independently

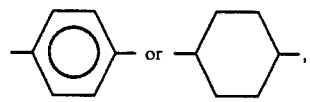

Y and L are each independently H or F,
X is F, Cl, —CF₃, —CHF₂, —OCF₃, —OCHF₂, —OCF₂CF₂H or —OC₂F₅, and
n is 0 or 1;

b) contains 0–40% by weight of a liquid-crystalline component B, comprising one or more compounds having a dielectric anisotropy of −1.5 to +1.5 at 20° C., of formula I

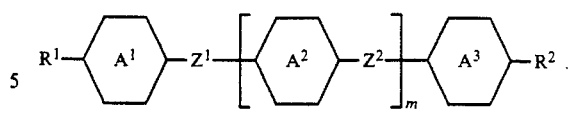
I wherein

R¹ and R² are each independently n-alkyl, n-alkoxy, n-oxaalkyl, straight-chain ω-fluoroalkyl or n-alkenyl having up to 9 carbon atoms, A¹, A² and A³ are each independently 1,4-phenylene, 2- or 3-fluoro-1,4-phenylene, trans-1,4-cyclohexylene or 1,4-cyclohexenylene, Z¹ and Z² are each, independently of one another, —CH₂CH₂—, —C≡C— or a single bond, and m is 0, 1 and 2;

c) contains 0–5% by weight of a liquid-crystalline component C, comprising one or more compounds having a dielectric anisotropy of below −1.5 at 20° C.; and d) contains an optically active component D in such an amount that the ratio between the layer thickness and the natural pitch of the chiral nematic liquid-crystal mixture is 0.2 to 1.3; and said nematic liquid-crystal mixture has a nematic phase range of at least 60° C., a viscosity of not more than 35 mPa.s at 20° C. and a dielectric anisotropy of at least +1 at 20° C.

2. A display according to claim 1, wherein component A contains compounds of the formulae IIg and IIh in which X is F and compounds of the formula IIf in which Y is F.

3. A display according to claim 1, wherein X in formulae IIg and IIh is F, Cl, CF₃, —OCF₃, —OCHF₂ or —CHF₂.

4. A display according to claim 2, wherein X in formulae IIg and IIh is F, Cl, CF₃, —OCF₃, —OCHF₂ or —CHF₂.

5. A display according to claim 1, wherein component B contains one or more compounds selected from formulae II1 to II7:

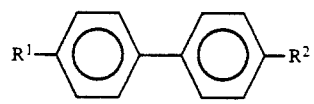
II1

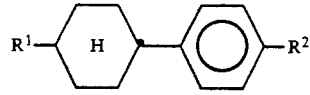
II2

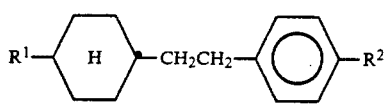
II3

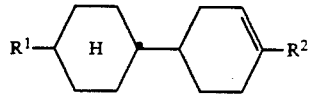
II4

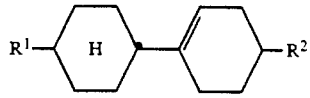
II5

-continued

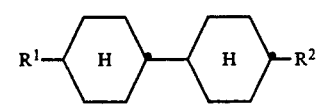
II6

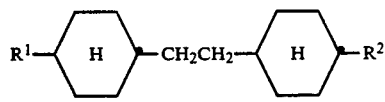
II7 wherein $R^1$ and $R^2$ are each independently n-alkyl, n-alkoxy, n-oxaalkyl, straight-chain, ω-fluoroalkyl or n-alkenyl having up to 9 carbon atoms.

6. A display according to claim 5, wherein component B additionally contains one or more compounds selected from formulae II8 to II21:

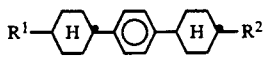
II8

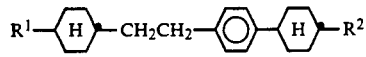
II9

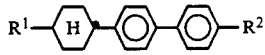
II10

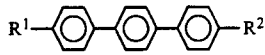
II11

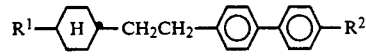
II12

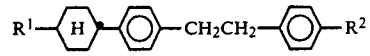
II13

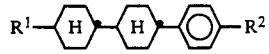
II14

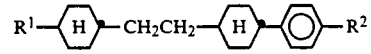
II15

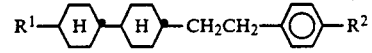
II16

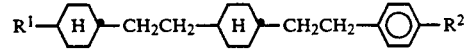
II17

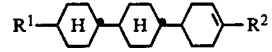
II18

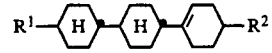
II19

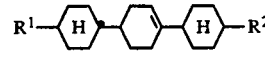
II20

II21 wherein
$R^1$ and $R^2$ are in each case independently n-alkyl, n-alkoxy, n-oxaalkyl, straight-chain, ω-fluoroalkyl or n-alkenyl having up to 9 carbon atoms, and the 1,4-phenylene groups in II8 to II17 and II21 may each, independently of one another, also be monosubstituted by fluorine.

7. A display according to claim 5, wherein component B additionally contains one or more compounds selected from formulae II22 to II27:

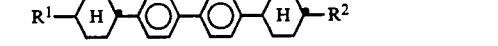
II22

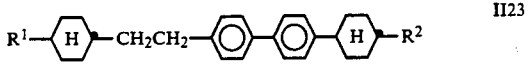
II23

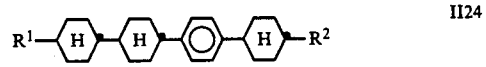
II24

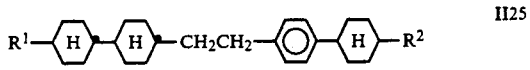
II25

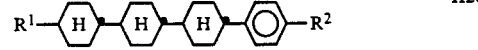
II26

II27 wherein
$R^1$ and $R^2$ are in each case independently n-alkyl, n-alkoxy, n-oxaalkyl, straight-chain ω-fluoroalkyl or n-alkenyl having up to 9 carbon atoms, and the 1,4-phenylene groups in II22 to II27 may each, independently of one another, also be monosubstituted by fluorine.

8. A display according to claim 6, wherein component B additionally contains one or more compounds selected from formulae II22 to II27:

II22

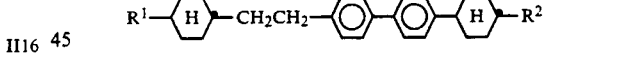
II23

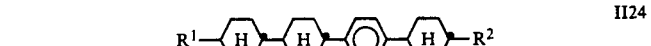
II24

II25

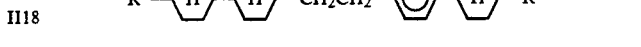
II26

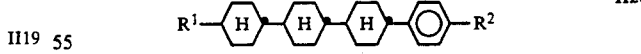
II27 wherein $R^1$ and $R^2$ are each independently n-alkyl, n-alkoxy, n-oxaalkyl, straight-chain ω-fluoroalkyl or n-alkenyl having up to 9 carbon atoms, and the 1,4-phenylene groups in II22 to II27 may each, independently of one another, also be monosubstituted by fluorine.

9. A display according to claim 1, wherein component B contains one or more compounds selected from formulae comprising II28 to II29:

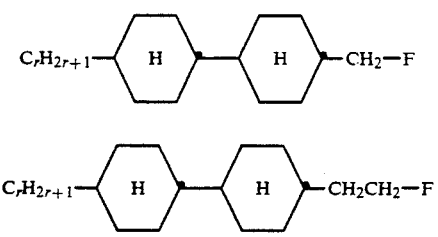

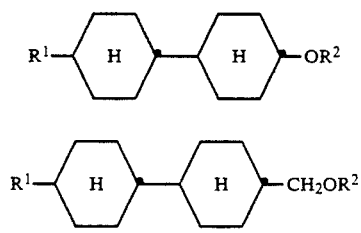

wherein $C_rH_{2r+1}$ is a straight-chain alkyl with r being 1 to 7.

10. A display according to claim 1, wherein said liquid-crystal mixture further contains one or more compounds selected from formulae III to IV:

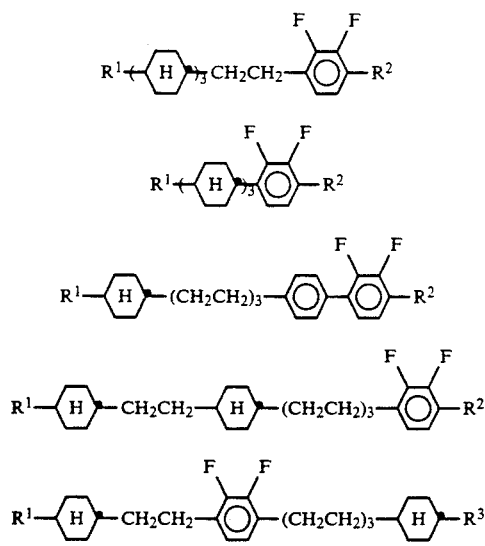

in which $R^1$ and $R^2$ are in each case independently n-alkyl, n-alkoxy, n-oxaalkyl, straight-chain ω-fluoroalkyl or n-alkenyl having up to 9 carbon atoms.

11. A display according to claim 1, wherein component C contains one or more compounds selected from formulae VII to XI:

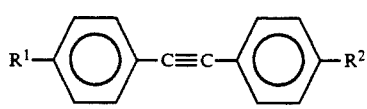

wherein $R^1$ and $R^2$ are in each case independently n-alkyl, n-alkoxy, n-oxaalkyl, ω-fluoroalkyl or n-alkenyl having up to 9 carbon atoms, and S is 0 or 1.

12. A display according to claim 1, wherein component B contains one or more compounds selected from formulae XII to XIV:

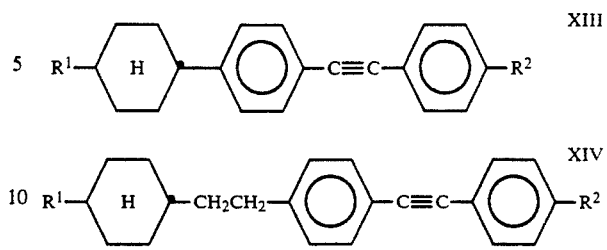

wherein $R^1$ and $R^2$ are in each case n-alkyl, n-alkoxy, n-oxaalkyl, straight-chain ω-fluoroalkyl or n-alkenyl having up to 9 carbon atoms 13. A display according to claim 1, wherein component A further contains one or more compounds of the formula T3

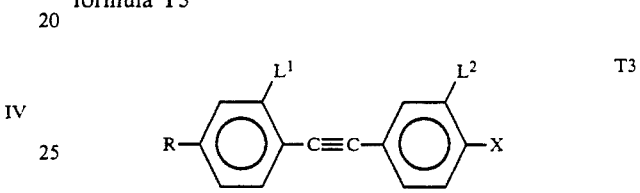

in which

R is $-C_nH_{2n+1}$, $-OC_nH_{2n+1}$, $C_nH_{2n+1}$, n is an integer from 1 to 15, $L^1$ and $L^2$ are each, independently of one another, H or F, and X is F, Cl or $OCF_3$.

14. A chiral nematic liquid-crystal mixture comprising at least two components wherein said nematic liquid-crystal mixture a) is based on component A, which contains one or more compounds of the formula IIa:

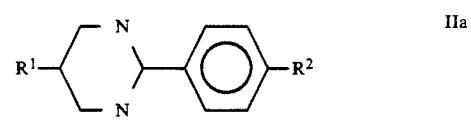

one or more compounds of the formulae IIc to IIe:

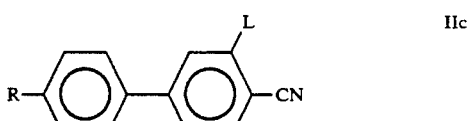

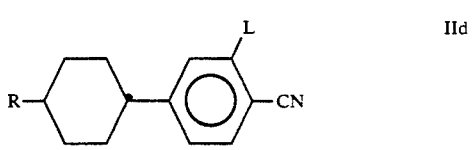

-continued

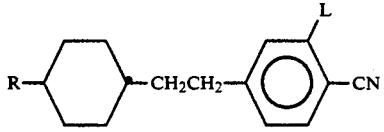   IIe and one or more compounds of the formulae IIf to IIh:

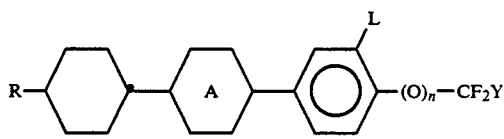   IIf

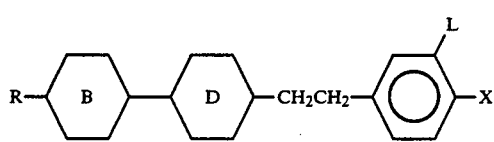   IIg

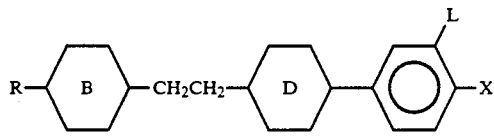   IIh in which
  $R^1$ and $R^2$ are each, independently, alkyl wherein the total number of carbon atoms in $R^1$ and $R^2$ together is 4–7,
  R is, in each case, independently, n-alkyl, n-alkoxy or n-alkenyl having up to 9 carbon atoms,

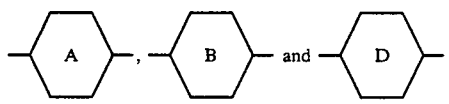

are each independently

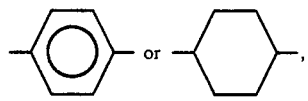

Y and L are each independently H or F,
  X is F, Cl, —CF$_3$, —CHF$_2$, —OCF$_3$, —OCHF$_2$, —OCF$_2$CF$_2$H or —OC$_2$F$_5$, and
  n is 0 or 1;
b) contains 0–40% by weight of a liquid-crystalline component B, comprising one or more compounds having a dielectric anisotropy of $-1.5$ to $+1.5$ at 20° C., of formula I

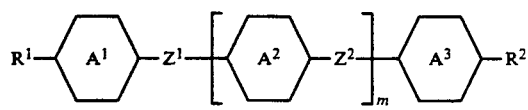   I wherein
  $R^1$ and $R^2$ are each independently n-alkyl, n-alkoxy, n-oxaalkyl, straight-chain ω-fluoroalkyl or n-alkenyl having up to 9 carbon atoms, $A^1$, $A^2$ and $A^3$ are each independently 1,4-phenylene, 2- or 3-fluoro-1,4-phenylene, trans-1,4-cyclohexylene or 1,4-cyclohexenylene,
  $Z^1$ and $Z^2$ are each, independently of one another, —CH$_2$CH$_2$—, —C≡C— or a single bond, and
  m is 0, 1 and 2;
c) contains 0–5% by weight of a liquid-crystalline component C, comprising one or more compounds having a dielectric anisotropy of below $-1.5$ at 20° C.; and
d) contains an optically active component D in such an amount that the ratio between the layer thickness and the natural pitch of the chiral nematic liquid-crystal mixture is 0.2 to 1.3; and
said nematic liquid-crystal mixture has a nematic phase range of at least 60° C., a viscosity of not more than 35 mPa.s at 20° C. and a dielectric anisotropy of at least $+1$ at 20° C.

15. A liquid-crystal mixture according to claim 14, wherein two of said components have substantially the same threshold voltage, one of said two components having an optical anisotropy of 0.100–0.110 and the other of said two components having an optical anisotropy of 0.170–0.180.

16. A display according to claim 1, wherein component A further contains one or more compounds of formula IIb

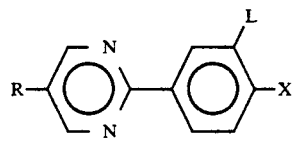   IIb wherein
  R is n-alkyl, n-alkoxy or n-alkenyl having up to 9 carbon atoms,
  L is H or F, and
  X is F, Cl, —CF$_3$, —CHF$_2$, —OCF$_3$, —OCHF$_2$, —OCF$_2$CF$_2$H or —OC$_2$H$_5$.

17. A display according to claim 16, wherein X in formula IIb is F, Cl, —CF$_3$, —OCF$_3$, —OCHF$_2$ or —CHF$_2$.

18. A display according to claim 16, wherein component A contains compounds of the formulae IIb, IIg and IIh in which X is F and compounds of the formula IIf in which Y is F.

19. A display according to claim 16, wherein X in formulae IIb, IIg and IIh is F, Cl, —CF$_3$, —OCF$_3$, —OCHF$_2$ or —CHF$_2$.

20. A mixture according to claim 14, wherein component A further contains one or more compounds of the formula IIb

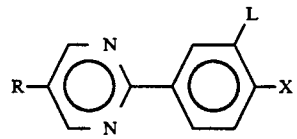   IIb wherein
  R is n-alkyl, n-alkoxy or n-alkenyl having up to 9 carbon atoms,
  L is H or F, and
  X is F, Cl, —CF$_3$, —CHF$_2$, —OCF$_3$, —OCHF$_2$, —OCF$_2$CF$_2$H or —OC$_2$H$_5$.

21. A display according to claim 1, wherein said mixture contains 20-99.95 wt. % of component A and 0.1-35 wt. % of component D.

22. A display according to claim 21, wherein said mixture contains 0-25 wt. % of component B.

23. A display according to claim 22, wherein said mixture contains 40-99.95 wt. % of component A and 0.1-10 wt. % of component D.

24. A display according to claim 1, wherein said mixture contains 20-99.95 wt. % component A, 3-35 wt. % component B, and 0.1-35 wt. % component D.

25. A display according to claim 14, wherein said mixture contains 20-99.95 wt. % component A and 0.1-35 wt. % component D.

26. A mixture according to claim 25, wherein said mixture contains 0-25 wt. % of component B.

27. A mixture according to claim 26, wherein said mixture contains 40-99.95 wt. % of component A and 0.1-10 wt. % of component D.

28. A mixture according to claim 14, wherein said mixture contains 20-99.95 wt. % component A, 3-35 wt. % component B, and 0.1-35 wt. % component D.

* * * * *

UNITED STATES PATENT AND TRADEMARK OFFICE
CERTIFICATE OF CORRECTION

PATENT NO. : 5,308,538
DATED : May 3, 1994
INVENTOR(S) : Georg WEBER et al.

It is certified that error appears in the above-indentified patent and that said Letters Patent is hereby corrected as shown below:

Claim 1; Column 32; Line 55 and, Claim 14; Column 38; Line 51

Reads . . .

Should read . . 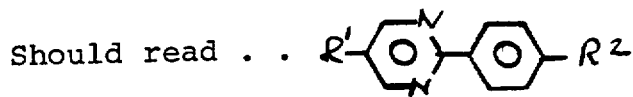

Signed and Sealed this

Sixth Day of September, 1994

BRUCE LEHMAN

*Attest:*

*Attesting Officer*     *Commissioner of Patents and Trademarks*